US011905793B2

(12) United States Patent
Wang

(10) Patent No.: US 11,905,793 B2
(45) Date of Patent: Feb. 20, 2024

(54) ROTATION CONVERTER

(71) Applicant: GQ Technical LLC, Duncansville, PA (US)

(72) Inventor: Guochang Wang, Duncansville, PA (US)

(73) Assignee: GQ Technical LLC, Duncansville, PA (US)

( * ) Notice: Subject to any disclaimer, the term of this patent is extended or adjusted under 35 U.S.C. 154(b) by 0 days.

(21) Appl. No.: 18/298,086

(22) Filed: Apr. 10, 2023

(65) Prior Publication Data

US 2024/0003191 A1 Jan. 4, 2024

Related U.S. Application Data

(63) Continuation of application No. 17/856,619, filed on Jul. 1, 2022, now Pat. No. 11,649,678.

(51) Int. Cl.

| | |
|---|---|
| ***E21B 4/02*** | (2006.01) |
| ***F15B 15/02*** | (2006.01) |
| ***F16H 1/28*** | (2006.01) |
| ***H02K 16/00*** | (2006.01) |
| ***E21B 4/00*** | (2006.01) |

(52) U.S. Cl.
CPC ................ *E21B 4/02* (2013.01); *F15B 15/02* (2013.01)

(58) Field of Classification Search
CPC . E21B 4/02; E21B 4/006; F15B 15/02; F16H 1/2854; F16H 48/12; F16H 3/145; H02K 16/005
See application file for complete search history.

(56) References Cited

U.S. PATENT DOCUMENTS 8,608,608 B1 * 12/2013 Simpkins ............. F16H 1/2854 475/230
2011/0143879 A1 * 6/2011 Vogel ...................... F16H 48/08 475/230

* cited by examiner

*Primary Examiner* — Deming Wan

(57) ABSTRACT

A rotation converter configured to convert an alternative clockwise-counterclockwise rotation to a single rotation direction, including: a hex shaft including an input hex, an output hex, and a gear contact, wherein the input hex and output hex are separated by the gear contact; a hex mover coupled to the input hex, wherein the hex mover includes following teeth and driving teeth; a following ring gear in contact with the following teeth; a driving ring gear in contact with the driving teeth; one or more gear pinions in contact with the following ring gear and the driving ring gear; one or more gear rods configured to support the one or more gear pinions; and a gear holder coupled to the one or more gear rods.

16 Claims, 28 Drawing Sheets

ROTATION CONVERTER

TECHNICAL FIELD

The present disclosure relates to the field of rotation converters, and more particularly relates to a rotation converter for converting an alternative clockwise-counterclockwise rotation to a single rotation direction.

BACKGROUND

Conventional oil or gas well drilling methods, especially for horizontal wells and directional wells, include the use of a mud motor powering a drill bit to generate a high amount of torque and rotations per minute (RPM) during a drilling operation. Depending on the type of drilling operation, different configurations of mud motors, drill bits, etc. may be used according to drilling requirements. A drilling system must be able to endure a high amount of stress caused by the large amount of force required for drilling, and efficiently maintain a consistent power output throughout the drilling operation. In many configurations, drilling fluid may be pumped through the drilling pipes, out of the drill bit, and back to the surface to simultaneously power the mud motor, cool the drill bit, and remove debris from the wellbore.

Because of the large amount of torque and RPM required to drill oil or gas wells, conventional drilling methods include many different points of failure. For example, without limitation, indicators of downhole mud motor failure may include frequent stalling, high surface pressure or pressure fluctuation, etc. and may result in a loss in rate of penetration (ROP) or complete system failure. As a key component of horizontal and directional drilling, there is a need for improvements of the mud motor to avoid system failure and increase efficiency of drilling operations.

Therefore, a heretofore unaddressed need exists in the art to address the aforementioned deficiencies and inadequacies.

SUMMARY

In one embodiment, a motor system for drilling an oil or gas well is described. The motor system includes: a cylindrical body; a converter configured to convert a two-directional rotation into a one-directional rotation; a rotatable shaft configured to be (a) disposed inside of the cylindrical body, (b) rotatable in both a counterclockwise direction and a clockwise direction, and (c) coupled to a drill bit through the converter; a driving piston configured to be coupled to the rotatable shaft and configured to divide the cylindrical body into a first chamber and a second chamber; and a flow piston configured to change flow direction of a fluid within the cylindrical body to drive the driving piston, wherein the driving piston is configured to be driven by the fluid via a pressure difference to move in a forward direction and in a reverse direction.

In another embodiment the flow piston is configured to be in a first position and a second position.

In another embodiment when the flow piston is in the first position, the fluid in the first chamber is of a higher pressure than the fluid in the second chamber so that the driving piston is to move in the forward direction.

In another embodiment when the flow piston is in the second position, the fluid in the second chamber is of a higher pressure than the fluid in the first chamber so that the driving piston is to move in the reverse direction opposite to the forward direction.

In another embodiment, the motor system further includes a control cylinder, wherein movement of the flow piston between the first position and the second position is controlled via the control cylinder.

In another embodiment the control cylinder comprises a control cylinder body, a control cylinder piston, and a control cylinder shaft; the control cylinder body is divided into a first control cylinder chamber and a second control cylinder chamber via the control cylinder piston; the control cylinder piston is coupled to a first end of the control cylinder shaft; and a second end of the control cylinder shaft is coupled to the flow piston.

In another embodiment the flow piston is configured to be in the first position when the control cylinder piston is in a first control position; and the flow piston is configured to be in the second position when the control cylinder piston is in a second control position.

In another embodiment, the motor system further includes forward triggers disposed on a forward end of the cylindrical body and rear triggers disposed on a rear end of the cylindrical body, wherein the forward triggers are configured to be activated by the driving piston and cause the control cylinder piston to move from the first control position to the second control position; and the rear triggers are configured to be activated by the driving piston and cause the control cylinder piston to move from the second control position to the first control position.

In another embodiment, the motor system further includes a first normally-closed valve and a second normally-closed valve; wherein the first normally-closed valve and the second normally-closed valve are configured to open in response to activation of the forward triggers, thus allowing the fluid to flow into the first control cylinder chamber and out of the second control cylinder chamber; the first normally-closed valve and the second normally-closed valve are configured to open in response to activation of the rear triggers, thus allowing the fluid to flow out of the first control cylinder chamber and into the second control cylinder chamber; and the first normally-closed valve and the second normally-closed valve are configured to close after movement of the control cylinder piston either from the first control position to the second control position or from the second control position to the first control position is complete.

In another embodiment the cylindrical body further comprises an inlet opening and an outlet opening; fluid is input into the cylindrical body via the inlet opening; and fluid is output from the cylindrical body via the outlet opening.

In another embodiment the cylindrical body further comprises a first transfer opening and a second transfer opening; the flow piston further comprises a transfer chamber; the first transfer opening is disposed on the first chamber; the second transfer opening is disposed on the second chamber; and the first transfer opening is connected to the second transfer opening via a transfer pipe.

In another embodiment when the flow piston is in the first position, fluid flows into the first chamber via the inlet opening; and the transfer chamber connects the first transfer opening and the outlet opening such that fluid from the second chamber flows out of the second transfer opening, through the transfer pipe, through the first transfer opening, through the transfer chamber, and through the outlet opening.

In another embodiment when the flow piston is in the second position, the transfer chamber connects the first transfer opening and the inlet opening such that fluid from the inlet opening flows into the transfer chamber, through the first transfer opening, through the transfer pipe, through the second transfer opening, and into the second chamber; and fluid flows out of the first chamber via the outlet opening.

In another embodiment the cylindrical body comprises a plurality of transfer pipes and a plurality of outlet pipes; the outlet pipes are configured to connect the outlet opening to an output; and the outlet pipes and the transfer pipes are alternatingly arranged along a periphery of the cylindrical body.

In another embodiment the flow piston further comprises an inner passage; and when the flow piston is in the first position, fluid flows from the inlet opening, through the inner passage, and into the first chamber.

The motor system of claim 1, further comprising one or more support rods configured to prevent torsion of the driving piston.

In another embodiment, the motor system further includes a first input normally-closed valve, a second input normally-closed valve, a first output normally-closed valve, and a second output normally-closed valve; wherein the first input normally-closed valve and the first output normally-closed valve are configured to open in response to activation of the forward triggers thus allowing the fluid to flow into the first control cylinder chamber and out of the second control cylinder chamber; the second input normally-closed valve and the second output normally-closed valve are configured to open in response to activation of the rear triggers thus allowing the fluid to flow into the second control cylinder chamber and out of the first control cylinder chamber; and the first input normally-closed valve, the second input normally-closed valve, the first output normally-closed, and the second output normally-closed valve are configured to close after movement of the control cylinder piston either from the first control position to the second control position or from the second control position to the first control position is complete.

In another embodiment the outlet pipes are configured to transfer the fluid to a cavity of the convertor and then to the drill bit.

In another embodiment the fluid may be water, oil, or gas.

BRIEF DESCRIPTION OF THE DRAWINGS

The accompanying drawings illustrate one or more embodiments of the present disclosure and, together with the written description, serve to explain the principles of the present disclosure, wherein:

FIGS. 1A-1H illustrate a fluid flow sequence of an exemplary piston motor system, wherein FIG. 1A shows an initial flow sequence for a flow piston in a first position, FIG. 1B shows an intermediate flow sequence for a flow piston in a first position, FIG. 1C shows a flow sequence immediately before triggering a flow piston to move to a second position, FIG. 1D shows a flow sequence after triggering two normally-closed valves to open for a flow piston in a first position, FIG. 1E shows an initial flow sequence for a flow piston in a second position, FIG. 1F shows an intermediate flow sequence for a flow piston in a second position, FIG. 1G shows a flow sequence immediately before triggering a flow piston to move to a first position, and FIG. 1H shows a flow sequence after triggering two normally-closed valves to be open for a flow piston in a second position, in accordance with an embodiment of the present disclosure;

FIGS. 2A-2B illustrate an exemplary drill bit connector, wherein FIG. 2A shows a top perspective view of an exemplary drill bit connector and FIG. 2B shows a bottom perspective view of an exemplary drill bit connector, in accordance with an embodiment of the present disclosure;

FIGS. 3A-3B illustrate an exemplary 2-to-1 rotation converter, wherein FIG. 3A shows a perspective view of an exemplary 2-to-1 rotation converter and FIG. 3B shows an exploded view of an exemplary 2-to-1 rotation converter, in accordance with an embodiment of the present disclosure;

FIGS. 4A-4B illustrate an exemplary output cap, wherein FIG. 4A shows a perspective view of an exemplary output cap and FIG. 4B shows a top view of an exemplary output cap, in accordance with an embodiment of the present disclosure;

FIGS. 7A-7B illustrate an exemplary cylindrical body, wherein FIG. 7A shows a perspective cross-sectional view of an exemplary cylindrical body and FIG. 7B shows a top view of an exemplary cylindrical body, in accordance with an embodiment of the present disclosure;

FIGS. 8A-8B illustrate an exemplary flow piston, wherein FIG. 8A shows a top perspective view of an exemplary flow piston and FIG. 8B shows a bottom perspective view of an exemplary flow piston, in accordance with an embodiment of the present disclosure;

FIGS. 10A-10B illustrate an exemplary input cap, wherein FIG. 10A shows a perspective view of an exemplary input cap and FIG. 10B shows a top view of an exemplary input cap, in accordance with an embodiment of the present disclosure;

FIGS. 11A-11C illustrate an exemplary control cylinder, wherein FIG. 11A shows a front perspective view of an exemplary control cylinder, FIG. 11B shows a rear perspective view of an exemplary control cylinder, and FIG. 11C shows a right cross-sectional view of an exemplary control cylinder in accordance with an embodiment of the present disclosure;

FIGS. 12A-12B illustrate an exemplary cylinder switch system, wherein FIG. 12A shows a section of an exemplary cylinder switch system integrated with an output cap and FIG. 12B shows a section of an exemplary cylinder switch system integrated with an input cap, in accordance with an embodiment of the present disclosure;

FIGS. 13A-13B illustrate an incorporated exemplary cylinder switch system, wherein FIG. 13A shows a section integrated with an output cap and FIG. 13B shows a section integrated with an input cap, in accordance with an embodiment of the present disclosure;

FIGS. 16A-16B illustrate an exemplary rotation output for a double-shaft piston motor, wherein FIG. 16A shows a first view of a rotation output for a double-shaft piston motor, and FIG. 16B shows a second view of a rotation output for a double-shaft piston motor, in accordance with an embodiment of the present disclosure;

FIGS. 18A-18B illustrate a fluid flow sequence of a second embodiment of an exemplary piston motor system, wherein FIG. 18A shows an exemplary flow piston moving from a first position to a second position and FIG. 18B shows an exemplary flow piston moving from a second position to a first position, in accordance with an embodiment of the present disclosure.

DETAILED DESCRIPTION

Figure 1A:
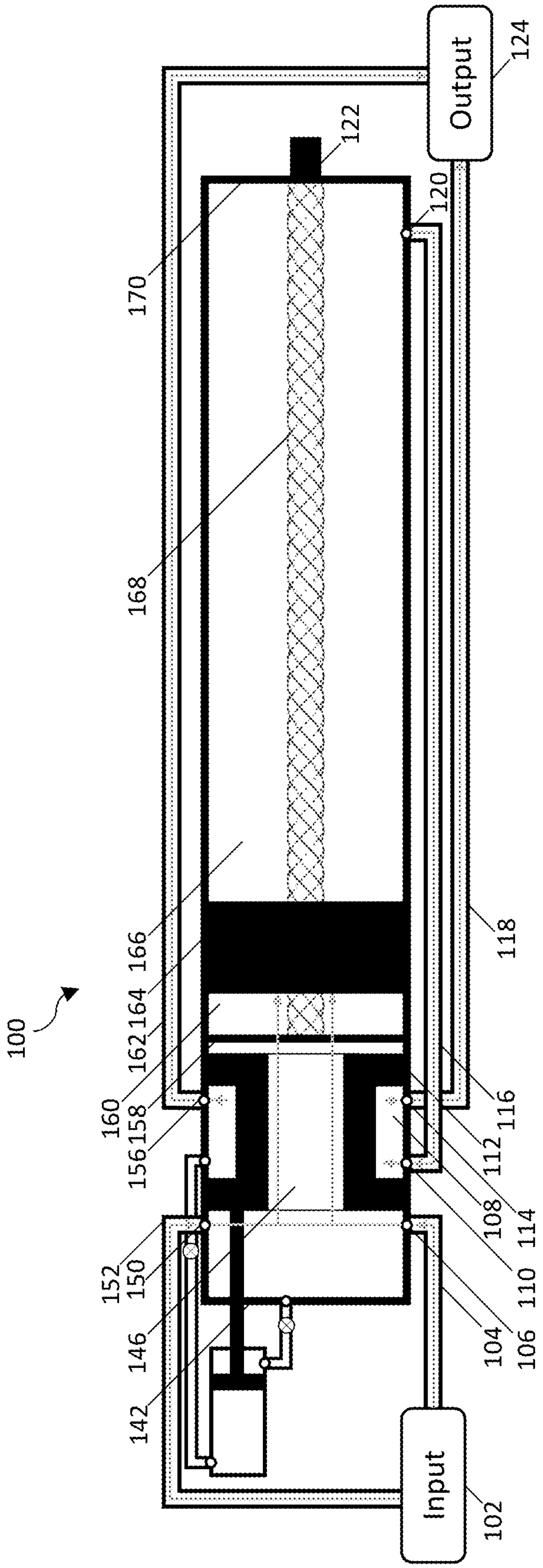

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the present disclosure to those skilled in the art. Like reference numerals refer to like elements throughout.

The terms used in this specification generally have their ordinary meanings in the art, within the context of the present disclosure, and in the specific context where each term is used. Certain terms that are used to describe the present disclosure are discussed below, or elsewhere in the specification, to provide additional guidance to the practitioner regarding the description of the present disclosure. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It is appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the present disclosure or of any exemplified term. Likewise, the present disclosure is not limited to various embodiments given in this specification.

It is understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It is understood that, although the terms Firstly, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present disclosure.

It is understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It is also appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the present disclosure. As used herein, the singular forms "a", "an", and "the" are intended to include the multiple forms as well, unless the context clearly indicates otherwise. It is further understood that the terms "comprises" and/or "comprising", or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top", may be used herein to describe one element's relationship to another element as illustrated in the figures. It is understood that relative terms are intended to encompass different orientations of the device in addition to the orientation shown in the figures. For example, if the device in one of the figures is turned over, elements described as being on the "lower" side of other elements will then be oriented on the "upper" sides of the other elements. The exemplary term "lower" can, therefore, encompass both an orientation of lower and upper, depending on the particular orientation of the figure. Similarly, for the terms "horizontal", "oblique" or "vertical", in the absence of other clearly defined references, these terms are all relative to the ground. Similarly, if the device in one of the figures is turned over, elements described as "below" or "beneath" other elements will then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present disclosure belongs. It is further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

Embodiments of the present disclosure are illustrated in detail hereinafter with reference to accompanying drawings. It should be understood that specific embodiments described herein are merely intended to explain the present disclosure, but not intended to limit the present disclosure.

In order to further elaborate the technical means adopted by the present disclosure and its effect, the technical scheme of the present disclosure is further illustrated in connection with the drawings and through specific mode of execution, but the present disclosure is not limited to the scope of the implementation examples.

The present disclosure relates to the field of oil and gas drilling, and more particularly relates to a piston motor system for drilling an oil or gas well.

Figure 1B:
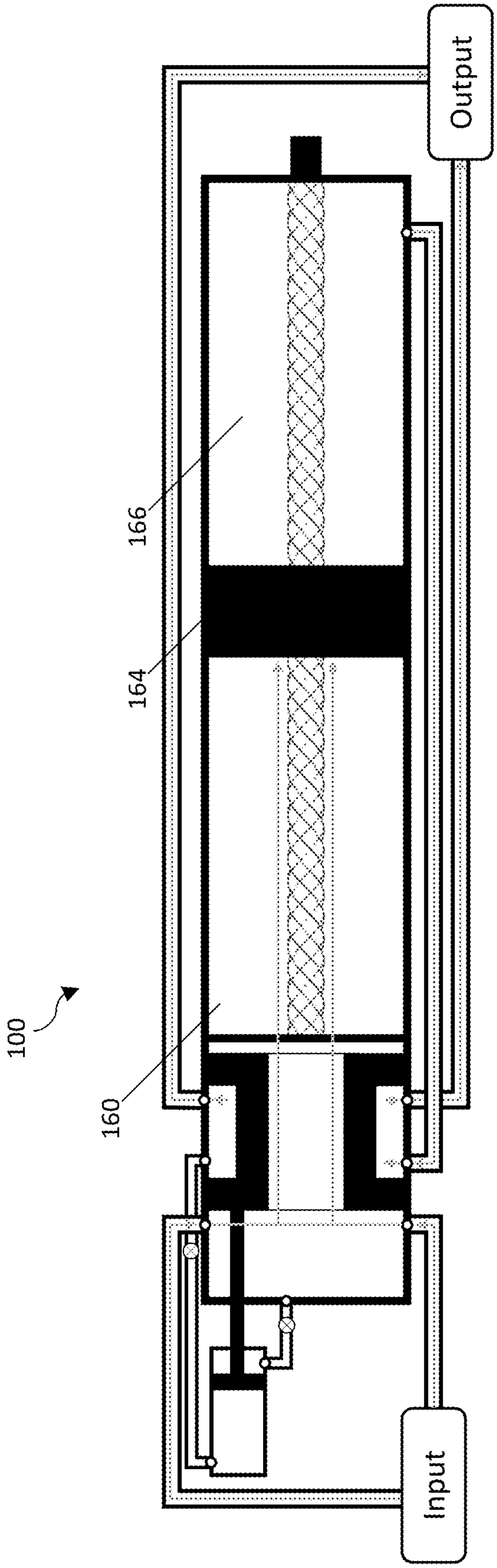
Figure 1C:
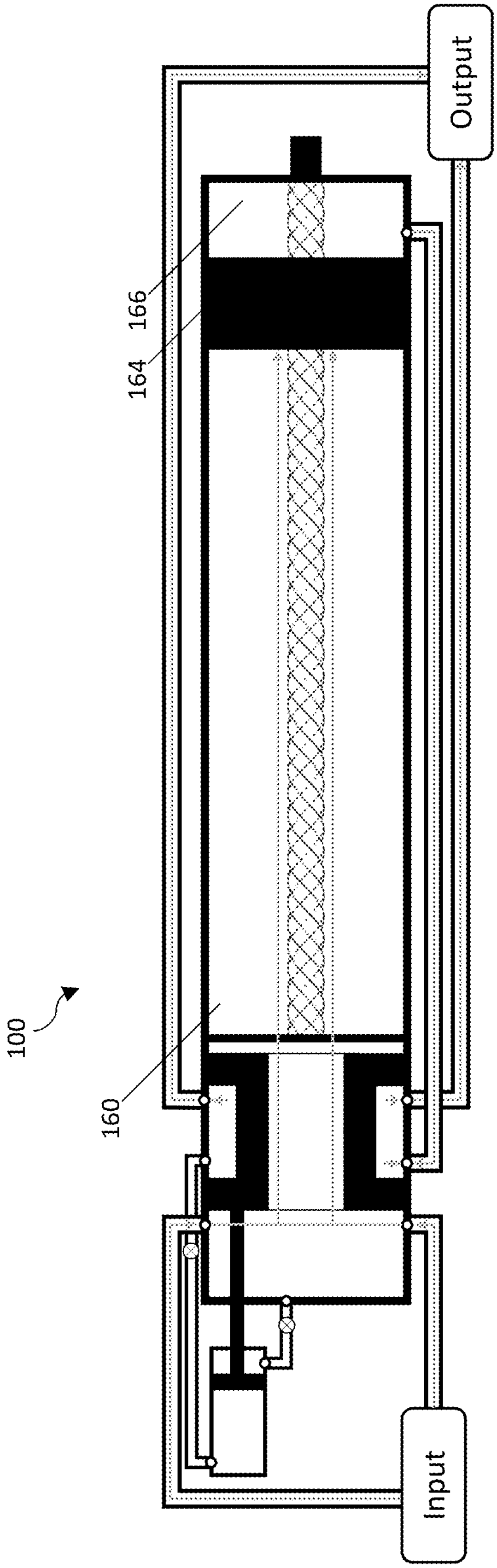
Figure 1D:
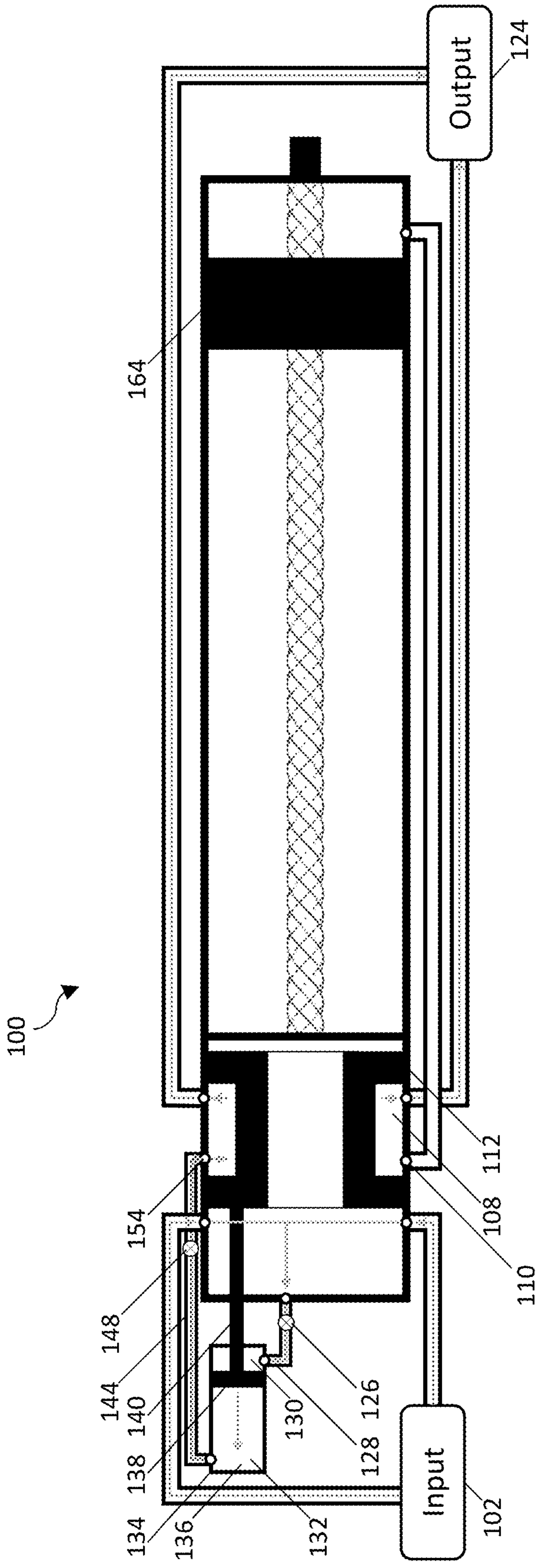
Figure 1E:
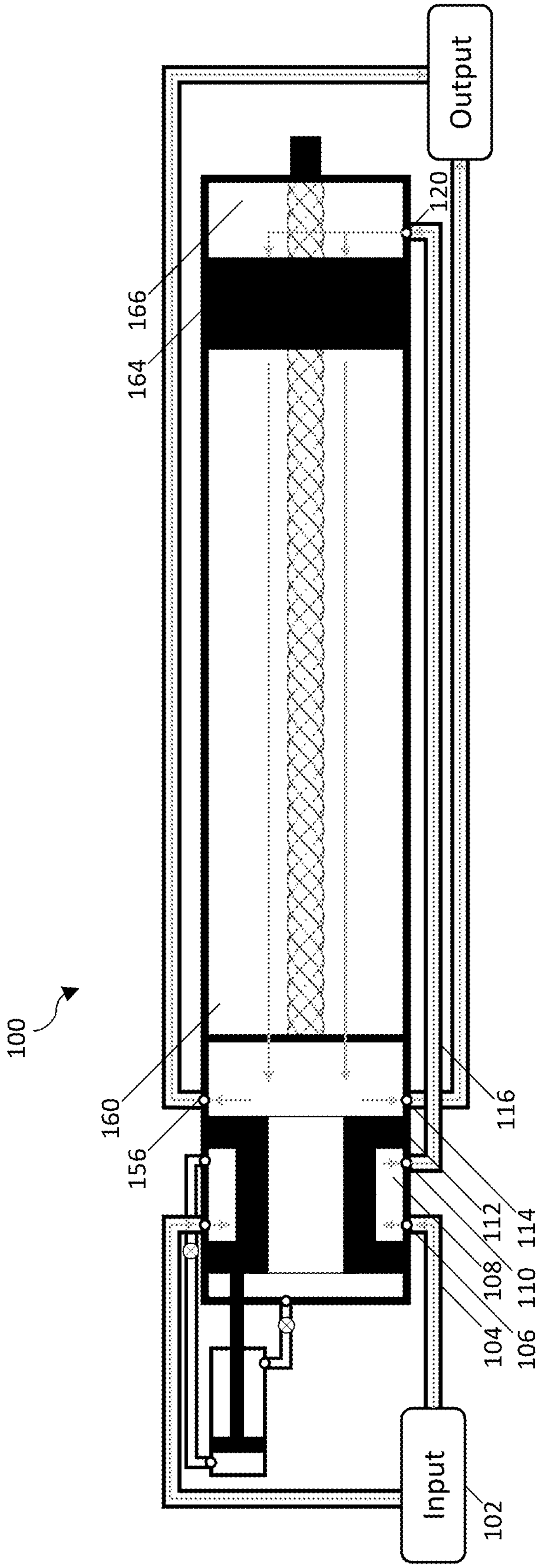
Figure 1F:
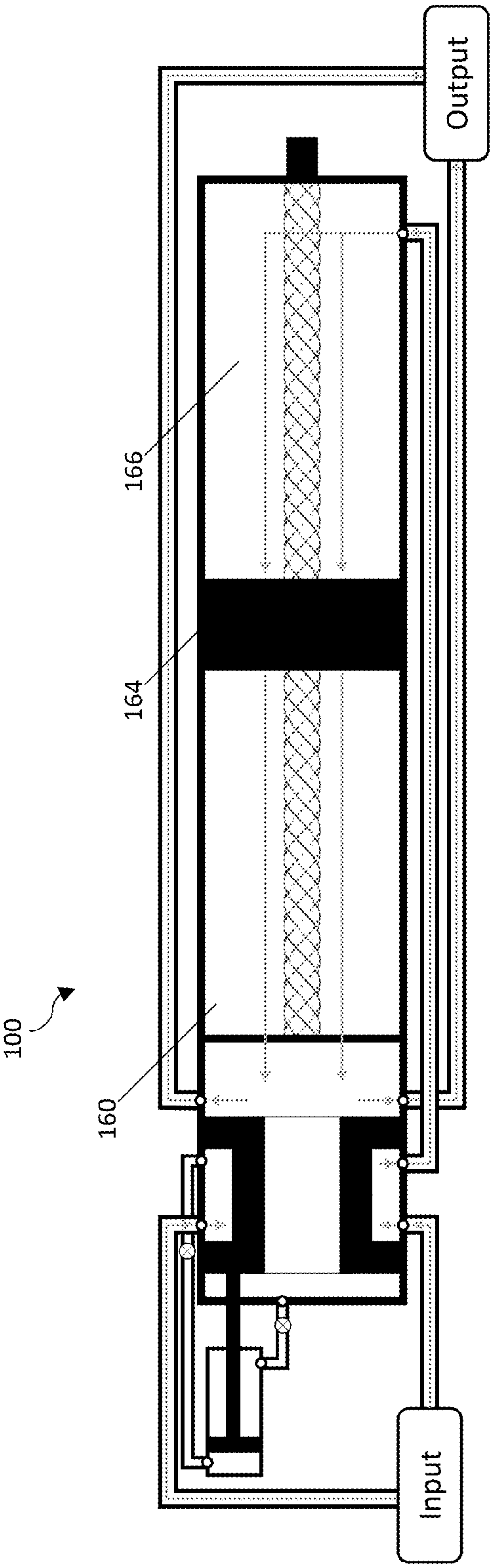
Figure 1G:
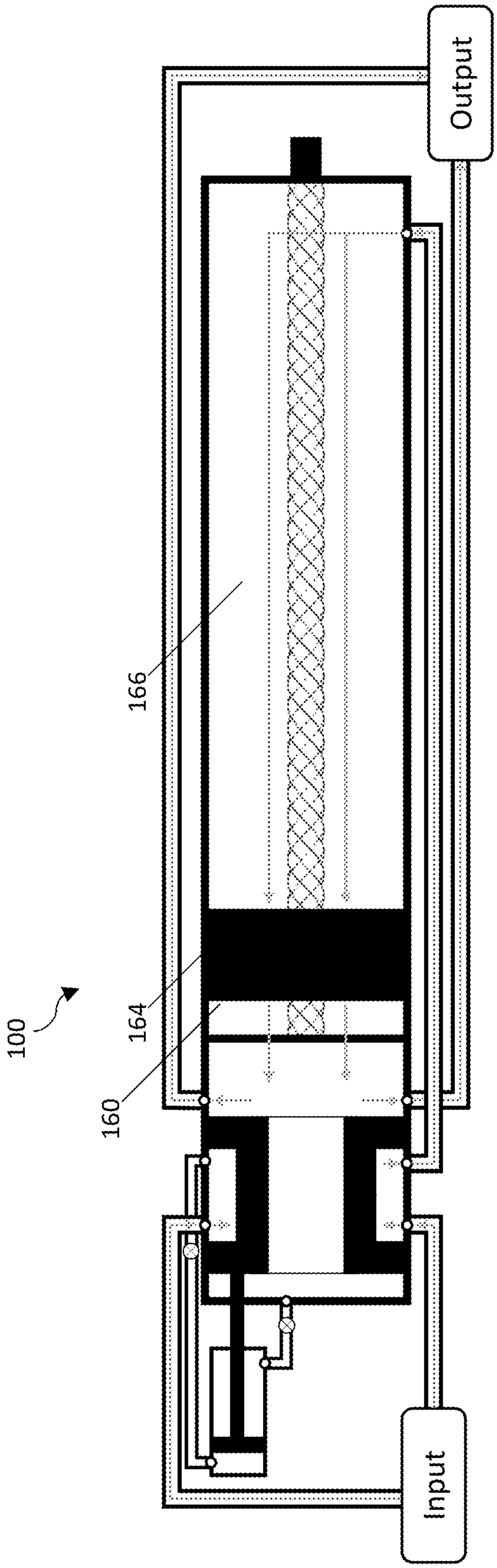
Figure 1H:
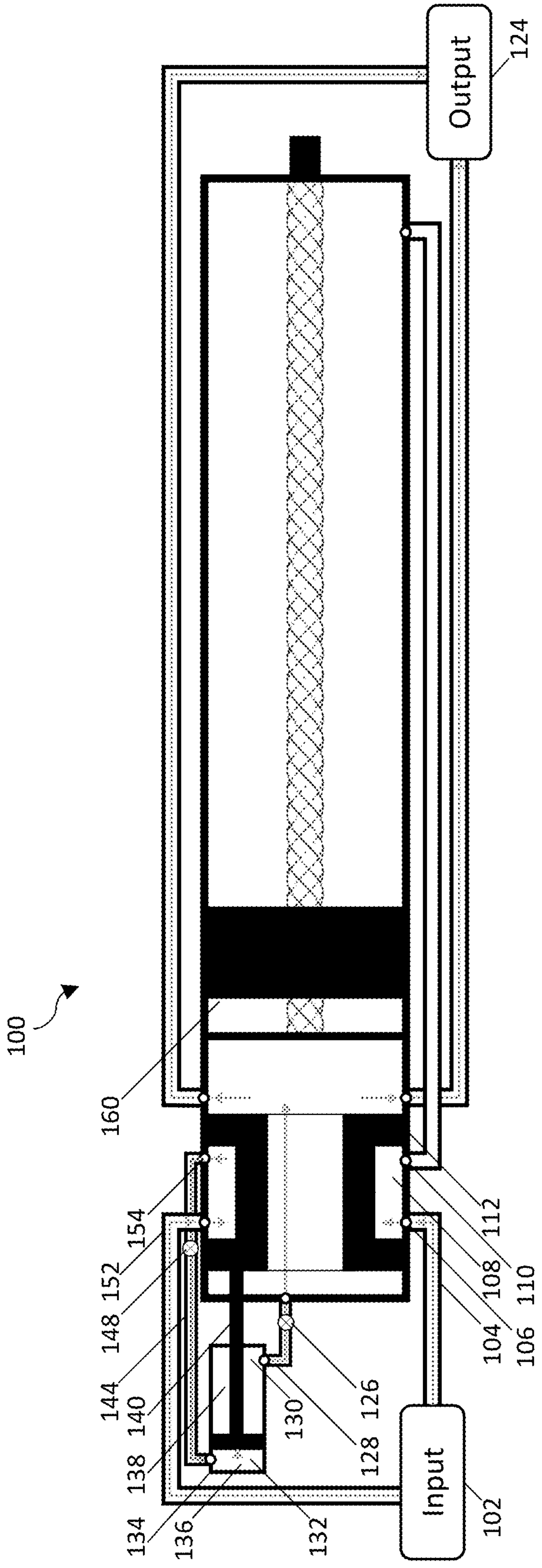

FIGS. 1A-1H illustrate a fluid flow sequence of an exemplary piston motor system, wherein FIG. 1A shows an initial flow sequence for a flow piston in a first position, FIG. 1B shows an intermediate flow sequence for a flow piston in a first position, FIG. 1C shows a flow sequence immediately before triggering a flow piston to move to a second position, FIG. 1D shows a flow sequence after triggering two normally-closed valves to be open for a flow piston in a first position, FIG. 1E shows an initial flow sequence for a flow piston in a second position, FIG. 1F shows an intermediate flow sequence for a flow piston in a second position, FIG. 1G shows a flow sequence immediately before triggering a flow piston to move to a first position, and FIG. 1H shows a flow sequence after triggering two normally-closed valves to be open for a flow piston in a second position, in accordance with an embodiment of the present disclosure.

For the purpose of illustrating the flow sequence of the present invention, with reference to FIGS. 1A-1H, a system diagram of piston motor 100 is described herein. It should be noted that the system diagram of piston motor 100 is for illustrative purposes only, and does not limit piston motor 100 to the particular embodiment shown.

Piston motor 100 is configured to utilize pressurized fluid from input 102 to move driving piston 164 in a first direction towards rotation output 122 (hereinafter a forward direction) and a second direction towards flow piston 112 (hereinafter a reverse direction). In the present embodiment, fluid may be, for example, without limitation, water, oil, gas, etc. When driving piston 164 moves in a forward direction, rotation shaft 168, coupled to rotation output 122, rotates clockwise. When driving piston 164 moves in a reverse direction, rotation shaft 168 rotates counterclockwise. In another embodiment, the rotation direction of rotation shaft 168 may be reversed relative to the direction of driving piston 164. Namely, when driving piston 164 moves in a forward direction, rotation shaft 168 may rotate counterclockwise, and when driving piston 164 moves in a reverse direction, rotation shaft 168 may rotate clockwise.

A 2-to-1 rotation converter (not shown, to be described with reference to FIGS. 3A-3B) may be used between rotation shaft 168 and rotation output 122 such that rotation output 122 is in a single rotation direction. For example, while rotation shaft 168 rotates in a clockwise direction and a counterclockwise direction, rotation output 122 may only rotate in a clockwise direction or only rotate in a counterclockwise direction as the 2-to-1 rotation converter converts the two rotation directions of rotation shaft 168 into a single rotation direction of rotation output 122.

Piston motor 100 comprises first chamber 160 and second chamber 166 separated via driving piston 164. Flow piston 112 may be used to control the flow of fluid within piston motor 100. When flow piston 112 is in a first position (as shown in FIGS. 1A-1D), a pressurized fluid from input 102 flows into first chamber 160 such that the fluid pressure in first chamber 160 is higher than the fluid pressure in second chamber 166. Thus, driving piston 164 moves in the forward direction and rotation shaft 168 rotates clockwise. When flow piston 112 in a second position (as shown in FIGS. 1E-1H), a pressurized fluid from input 102 flows into second chamber 166 such that the fluid pressure in second chamber 166 is higher than the fluid pressure in first chamber 160. Thus, driving piston 164 moves in the reverse direction and rotation shaft 168 rotates counterclockwise.

An exemplary initial flow sequence of piston motor 100 is shown with reference to FIG. 1A. A pressurized fluid from input 102 flows through first inlet pipe 104 to first inlet opening 106 and also through second inlet pipe 152 to second inlet opening 150 of input cap 142, through inner passage 146, and into first chamber 160. Thus, the fluid in first chamber 160 is high pressure in comparison to the fluid in second chamber 166 and causes driving piston 164 to move in the forward direction. As driving piston 164 moves in the forward direction, a portion of the fluid in second chamber 166 flows to output 124. The flow path of fluid from second chamber 166 to output 124 is as follows: fluid exits second chamber 166 via second transfer opening 120 and flows through transfer pipes 116 and into first transfer opening 110 of annular transfer chamber 108. Flow piston 112 directs fluid from first transfer opening 110 to first outlet opening 114 and second outlet opening 156 via annular transfer chamber 108, where annular transfer chamber 108 is a sealed off portion of first chamber 160. Thus, fluid from first transfer opening 110 flows through annular transfer chamber 108 and out of first outlet opening 114 and second outlet opening 156. Fluid from first outlet opening 114 flows through first outlet pipe 118 to output 124, and fluid from second outlet opening 156 flows through second outlet pipe 162 to output 124. The exact structure of flow piston 112 will be described below with reference to FIGS. 8A-8B.

Driving piston 164 moves in a forward direction from the position shown in FIG. 1A to the position shown in FIG. 1B (intermediate flow sequence) and then to the position shown in FIG. 1C, before flow piston 112 moves into a second position. While driving piston 164 moves in the forward direction, first chamber 160 becomes larger as second chamber 166 becomes smaller, relative to the position of driving piston 164.

With reference to FIG. 1D, for driving piston 164 to switch from moving in the forward direction to moving in the reverse direction, driving piston 164 reaches a first end of rotation shaft 168 adjacent to rotation output 122 and activates forward triggers (not shown) at a forward end of second chamber 166. In the present embodiment, the forward triggers hydraulically communicate with first normally-closed valve 126 and second normally-closed valve 148. However, different communication means may be used between the forward triggers, first normally-closed valve 126, and second normally-closed valve 148. For example, without limitation, mechanical compression, electronic signaling, pneumatic signaling, etc. may be used after the forward triggers are activated by driving piston 164 to cause first normally-closed valve 126 and second normally-closed valve 148 to open. Alternatively, first normally-closed valve 126 and second normally-closed valve 148 may open according to a pre-set schedule without the need for the forward triggers, or may be opened remotely.

After driving piston 164 reaches the forward end of rotation shaft 168 adjacent to output cap 170 as shown in FIG. 1C, flow piston 112 is triggered to move from the first position to the second position. Control cylinder piston 138 is directly coupled to flow piston 112 via control cylinder shaft 140. Thus, similar to flow piston 112, control cylinder piston 138 is configured to be in a first position and a second position. When flow piston 112 is in the first position, control cylinder piston 138 is also in the first position. Similarly, when flow piston 112 is in the second position, control cylinder piston 138 is also in the second position.

The flow path of fluid after the forward triggers are activated by driving piston 164 is shown in FIG. 1D. Control cylinder 134 includes control cylinder chamber 136, where control cylinder chamber 136 is divided into first control cylinder chamber 130 and second control cylinder chamber 132 via control cylinder piston 138. After the forward triggers are activated, first normally-closed valve 126 and second normally-closed valve 148 are opened until the triggering process stops, allowing fluid to flow into and out of control cylinder 134 and causing control cylinder piston 138 to move from the first position to the second position. Specifically, fluid from input 102 flows into control cylinder 134 via first control cylinder pipe 128 and into first control cylinder chamber 130. Thus, fluid in first control cylinder chamber 130 is higher pressure than fluid in second control cylinder chamber 132, and control cylinder piston 138 moves from the first position to the second position. Because control cylinder piston 138 is coupled to flow piston 112 via control cylinder shaft 140, the movement of control cylinder piston 138 from the first position to the second position is translated to flow piston 112, causing flow piston 112 to also move from the first position to the second position. Fluid from second control cylinder chamber 132 is output via second control cylinder pipe 144. Fluid from second control cylinder pipe 144 flows through control cylinder opening 154, through annular transfer chamber 108, through second outlet opening 156, to second outlet pipe 162, and to output 124. Similarly, fluid from second control cylinder pipe 144 flows through control cylinder opening 154, through annular transfer chamber 108, through first outlet opening 114, to first outlet pipe 118, and to output 124. It should be noted that flow piston 112 is of a cylindrical shape, and thus comprises a single annular transfer chamber 108. Thus, while flow piston 112 is in the first position, fluid from first transfer opening 110 may flow through both first outlet opening 114 and second outlet opening 156, while fluid from control cylinder opening 154 may flow through both first outlet opening 114 and second outlet opening 156.

Flow piston 112 in the second position after the activation of the forward triggers is shown in FIG. 1E. Because flow piston 112 is in the second position, the flow pathways within piston motor 100 have changed such that input 102 is connected to second chamber 166 and first chamber 160 is connected to output 124.

The flow path of fluid when flow piston 112 is in the second position is as follows:

Fluid from input 102 flows through inlet pipe 104 and into annular transfer chamber 108 via first inlet opening 106. While in the second position, annular transfer chamber 108, sealed off from first chamber 160, connects first inlet opening 106 and first transfer opening 110. Thus, fluid from first inlet opening 106 flows through annular transfer chamber 108 and out of first transfer opening 110. Fluid from first transfer opening 110 flows through transfer pipes 116 and into second transfer opening 120. Thus, input 102 is connected to second chamber 166 and second chamber 166 to be of higher pressure than first chamber 160 causing driving piston 164 to move in the reverse direction. As driving piston 164 moves in the reverse direction, fluid from first chamber 160 flows to output 124. Fluid in first chamber 160 flows through first outlet opening 114, through first outlet pipe 118, and to output 124. Similarly, fluid in first chamber 160 may also flow through second outlet opening 156, through second outlet pipe 162, and to output 124.

As flow piston 112 is in the second position, driving piston 164 moves in the reverse direction to an intermediate position, as shown in FIG. 1F, and reaches the reverse end of rotation shaft 168 adjacent to shaft holder 158, as shown in FIG. 1G. Rear triggers (not shown) are then activated by driving piston 164 and causes flow piston 112 to move from the second position to the first position by the opening of first normally-closed valve 126 and second normally-closed valve 148.

As depicted in FIG. 1H, the flow path for moving the flow piston from the second position to the first position is shown. As second normally-closed valve 148 is open, fluid flows from input 102 to second control cylinder chamber 132. Specifically, fluid from input 102 flows through first inlet pipe 104 into first inlet opening 106 and also through second inlet pipe 152 into second inlet opening 150, and into annular transfer chamber 108. Annular transfer chamber 108 connects first inlet opening 106 and second inlet opening 150 with control cylinder opening 154. Thus, fluid from first inlet opening 106 and second inlet opening 150 flows into control cylinder opening 154 via annular transfer chamber 108. Fluid from control cylinder opening 154 flows through second control cylinder pipe 144 into second control cylinder chamber 132, causing second control cylinder chamber 132 to be higher pressure than first control cylinder chamber 130. As a result, control cylinder piston 138 moves into the first position along with flow piston 112.

As control cylinder piston 138 moves into the first position, fluid from first control cylinder chamber 130 is expelled to output 124. Specifically, fluid from first control cylinder chamber 130 flows out first cylinder pipe 128 as first normally-closed valve 126 is open. Fluid from first cylinder pipe 128 flows into first chamber 160, through inner passage 146 and out first outlet opening 114 into first outlet pipe 118 and to output 124. Similarly, fluid may also flow through inner passage 146, through second outlet opening 156, through second outlet pipe 162, and to output 124. As a result, piston motor 100 returns to the configuration shown in FIG. 1A and first normally-closed valve 126 and second normally-closed valve 148 are closed. Piston motor 100 continues cycling between the configurations shown in FIGS. 1A-1H such that rotation is output via rotation output 122.

It should be noted that the switching of flow piston 112 occurs approximately instantaneously such that rotation output 122 rotates with a constant torque. The switching shown in FIGS. 1D and 1H results in little to no loss in overall torque. Additionally, first normally-closed valve 126 and second normally-closed valve 148 are open only during the activation of the forward triggers and activation of the rear triggers, and remain closed prior to and immediately after the forward triggers and rear triggers are activated.

Rotation shaft 168 may include one or more male spirals and driving piston 164 may include one or more female spirals configured to be coupled to the one or more male spirals of rotation shaft 168. In the preferred embodiment, rotation shaft 168 includes 5 male spirals and driving piston 164 includes 5 female spirals. However, as will be appreciated by one skilled in the art, a greater or lesser number of spirals may be used for each of rotation shaft 168 and driving piston 164.

Figure 2A:
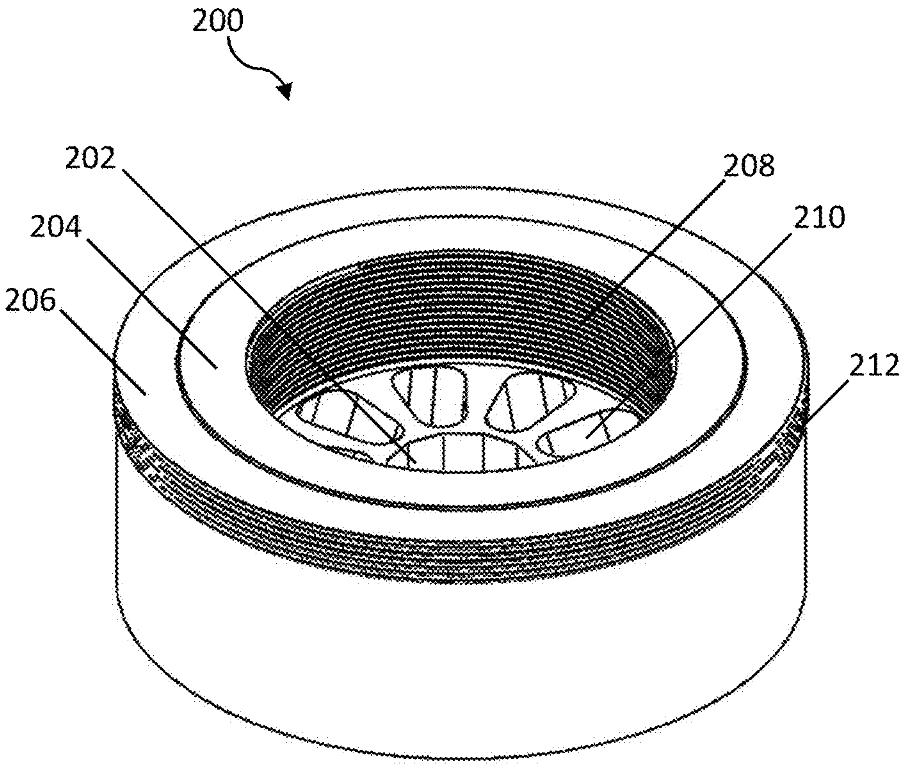
Figure 2B:
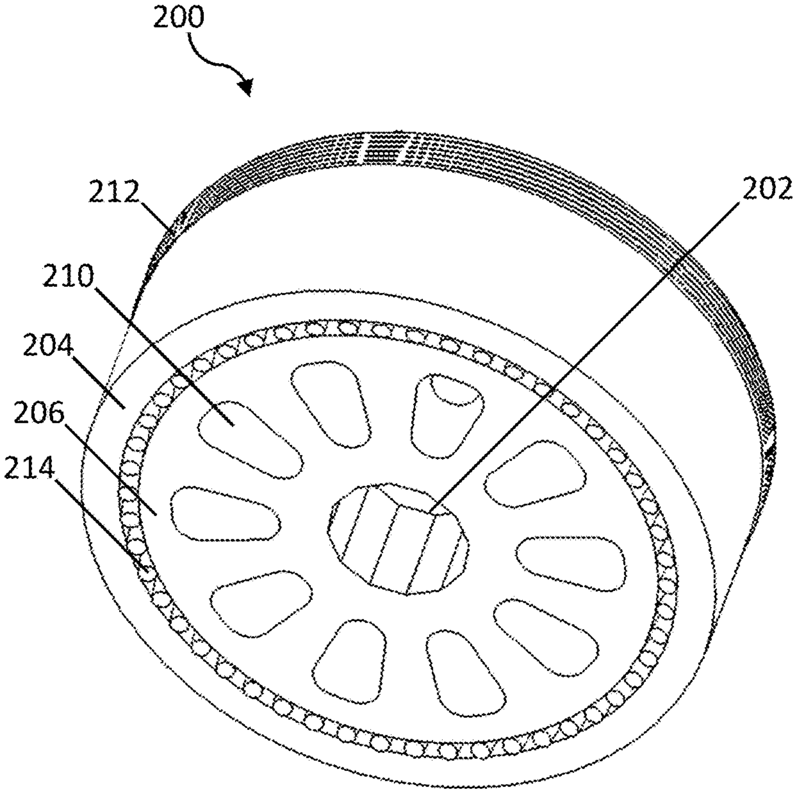

FIGS. 2A-2B illustrate an exemplary drill bit connector, wherein FIG. 2A shows a top perspective view of an exemplary drill bit connector and FIG. 2B shows a bottom perspective view of an exemplary drill bit connector, in accordance with an embodiment of the present disclosure. With reference to FIG. 2, drill bit connector 200 comprises hex opening 202, bearing outer body 204, inner body 206, drill bit threading 208, outlet openings 210, cylindrical body threading 212, and bearing needles 214. Drill bit connector 200 is configured to be coupled to a conventional oil and gas well drill bit via drill bit threading 208. Thus, the output rotation from the piston motor system of the present embodiment, for example, without limitation, may be used to power the conventional oil and gas well drill bit during drilling operations. While inner body 206 is configured to rotate, bearing outer body 204 is configured to remain static and may be coupled to cylindrical body 700 (to be described with reference to FIGS. 7A-7B) via cylindrical body threading 212. While the present embodiment utilizes threading as a coupling means, alternative coupling means may also be used to connect drill bit connector 200 to a conventional oil drill bit and cylindrical body 700. For example, without limitation, adhesive, channels, fasteners, rivets, etc. may be used as the coupling means.

Inner body 206 is separated from bearing outer body 204 via bearing needles 214, thus enabling inner body 206 to smoothly rotate while bearing outer body 204 remains static. Bearing needles 214 are of a cylindrical structure in the present embodiment. However, bearing needles 214 may alternatively be ball-shaped. Inner body 206 may be coupled to 2-to-1 rotation converter 300 (to be described with reference to FIGS. 3A-3B) via hex opening 202. Thus, rotation from 2-to-1 rotation converter 300 may be transferred to drill bit connector 200, and subsequently to the conventional oil and gas well drill bit. Fluid output from single shaft piston motor 1400 (to be described with reference to FIG. 14) flows through outlet openings 210 and through the conventional oil and gas well drill bit coupled to the bit connector. Conventional oil and gas well drill bits are typically hollow, allowing for fluid to flow through conventional oil and gas well drill bits to increase penetration rate and dislodge cuttings while simultaneously cooling and cleaning the drill bit. As will be appreciated by one skilled in the art, outlet openings 210 may be of various shapes and sizes and are not necessarily of the shape and size as shown in FIGS. 2A-2B. For example, without limitation, outlet openings 210 may be circular, rectangular, mesh, etc.

Figure 3A:
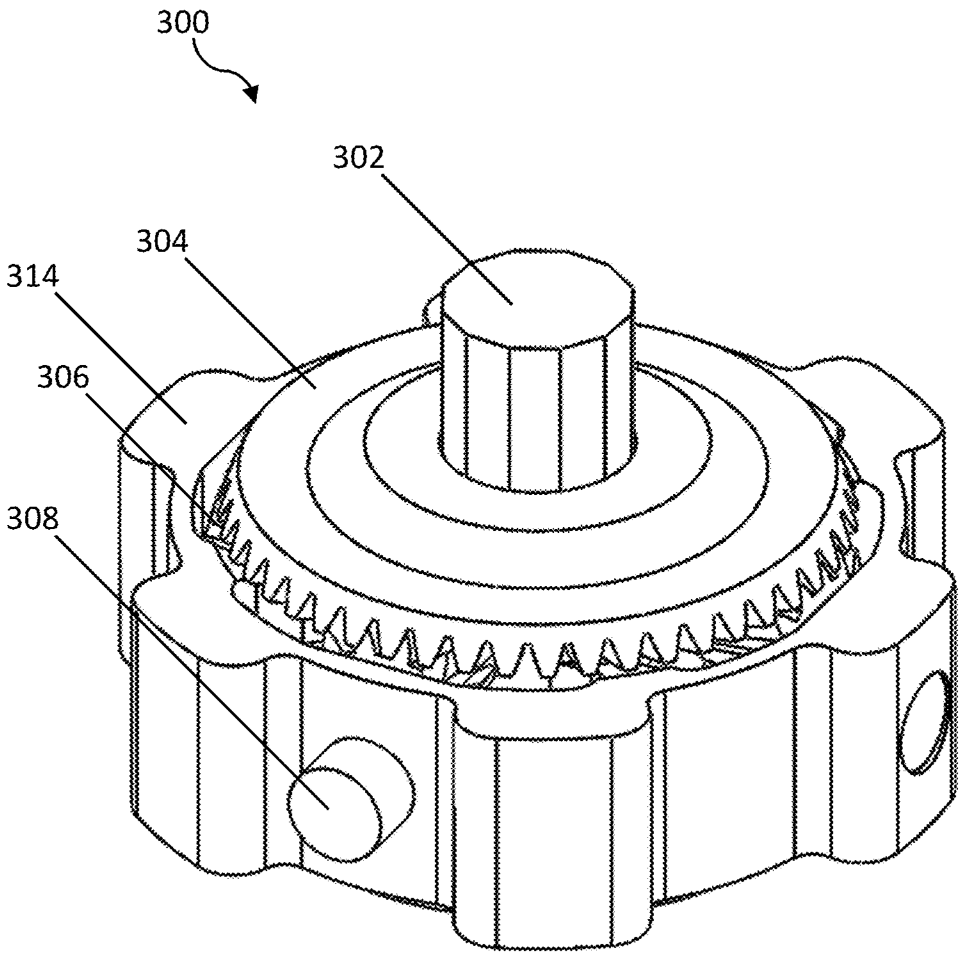
Figure 3B:
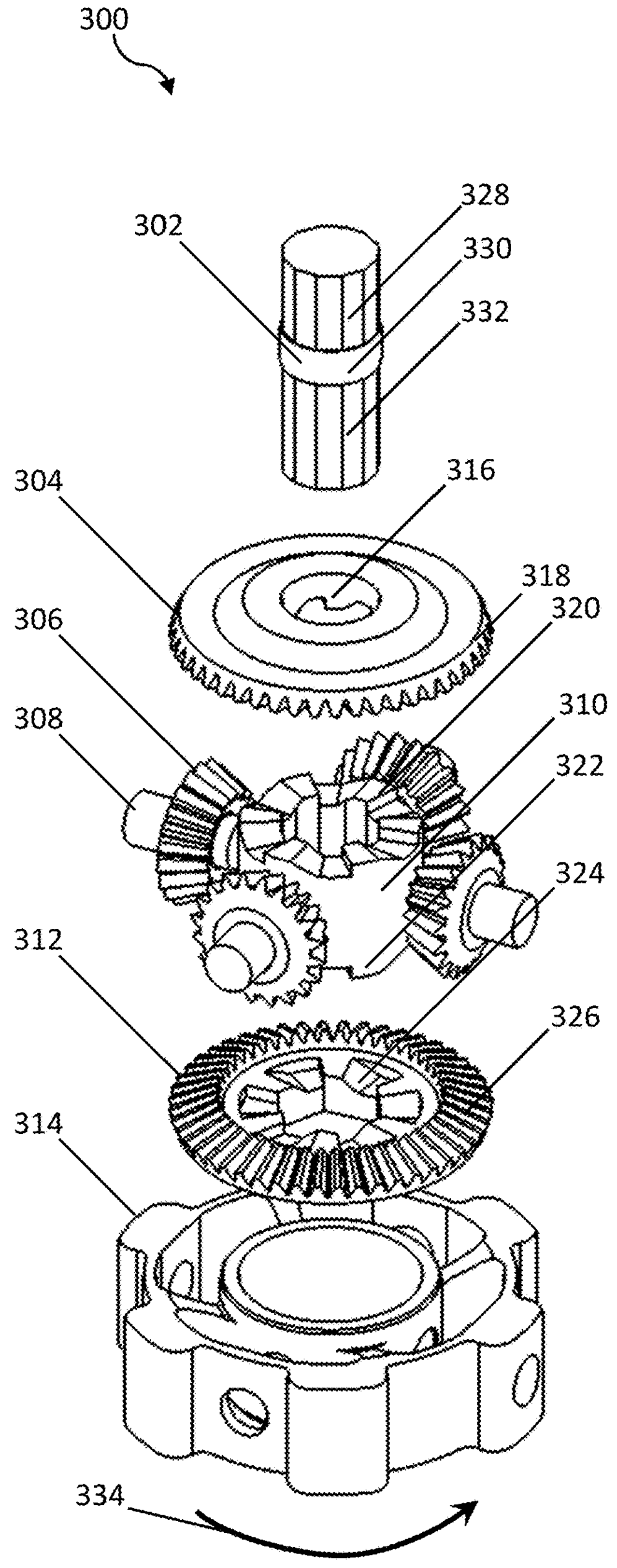

FIGS. 3A-3B illustrate an exemplary 2-to-1 rotation converter, wherein FIG. 3A shows a perspective view of an exemplary 2-to-1 rotation converter and FIG. 3B shows an exploded view of an exemplary 2-to-1 rotation converter, in accordance with an embodiment of the present disclosure. 2-to-1 rotation converter 300 comprises hex shaft 302, following ring gear 304, pinion gears 306, gear rods 308, hex mover 310, driving ring gear 312, and gear holder 314.

2-to-1 rotation converter 300 in the present embodiment is a rotation converter to convert an alternative clockwise-counterclockwise rotation to only clockwise or counterclockwise rotation. Namely, 2-to-1 rotation converter 300 is attached to rotation shaft 500 (to be described with reference to FIG. 5) which provides two rotation directions, and 2-to-1 rotation converter 300 outputs a single rotation direction via hex shaft 302. Gear holder 314 is configured to house the remaining components of 2-to-1 rotation converter 300.

Hex shaft 302 comprises output hex 328 and input hex 332 separated by gear contact 330. Output hex 328 is configured to be coupled to hex opening 202 of drill bit connector 200. Ring gear contact 330 is a section of hex shaft 302 with a smooth outer surface such that hex shaft 302 may rotate independently from following ring gear 304. Input hex 332 may be coupled to hex mover 310 such that hex shaft 302 rotates according to hex mover 310.

Gear rods 308 are equally distributed in four directions along hex mover 310, where gear rods 308 provide support for pinion gears 306. Gear rods 308 are coupled to gear holder 314 and are separated from hex mover 310 such that rotation of hex mover 310 does not affect gear rods 308. While the present embodiment includes four gear rods 308 and four pinion gears 306, as will be appreciated by one skilled in the art, a different number of gear rods 308 and pinion gears 306 may be utilized in 2-to-1 rotation converter 300. Rotation shaft 500 is coupled to driving ring gear 312 such that driving ring gear 312 rotates in the same direction as rotation shaft 500. For example, without limitation, when rotation shaft 500 rotates in a clockwise direction, driving ring gear 312 rotates in a clockwise direction. Similarly, when rotation shaft 500 rotates in a counterclockwise direction, driving ring gear 312 rotates in a counterclockwise direction.

Driving ring gear 312 and following ring gear 304 are configured to be parallel with each other and to be connected by pinion gears 306 as shown in FIG. 3B. Gear teeth in opinion gears 306 are in contact with driving gear outer teeth 326 and following gear outer teeth 318. Thus, driving gear outer teeth 326 face following gear outer teeth 318 but are not in direct contact with each other. Driving ring gear 312 rotates pinion gears 306 and pinion gears 306 rotate following ring gear 304.

The configuration of driving ring gear 312, following ring gear 304, and pinion gears 306 ensures an opposite rotation direction of driving ring gear 312 and following ring gear 304. The contact points of driving ring gear 312 and pinion gears 306 and contact points of following ring gear 304 and pinon gears 306 are on opposite sides of each of pinion gears 306. When driving ring gear 312 rotates in a clockwise direction, pinion gears 306 are driven to rotate in the same tangential direction as driving ring gear 312 at the contact points of driving ring gear 312 and pinion gears 306. Pinion gears 306 rotate following ring gear 304 in a tangential direction opposite to driving ring gears 312 at the contact points of driving ring gear 312 and pinon gears 306. Thus, following ring gear 304 rotates counterclockwise. Similarly, when driving ring gear 312 rotates in a counterclockwise direction, following ring gear 304 is driven by driving ring gear 312 to rotate clockwise through opinion gears 306.

Depending on the direction of rotation of the rotation input to 2-to-1 rotation converter 300, following ring gear 304 or driving ring gear 312 may be engaged with hex mover 310 via hex mover following teeth 320 and hex mover driving teeth 322, respectively. Specifically, hex mover following teeth 320 may be engaged with following gear inner teeth 316 when the input direction is counterclockwise, and hex mover driving teeth 322 may be engaged with driving gear inner teeth 324 when the input direction is clockwise. The structure of following gear inner teeth 316 and hex mover following teeth 320 are complementary and are configured to be engaged when following ring gear 304 rotates in a clockwise direction but disengaged when following ring gear 304 rotates in a counterclockwise direction. Similarly, the structure of driving gear inner teeth 324 and hex mover driving teeth 322 are complementary and are configured to be engaged when driving ring gear 312 rotates in a clockwise direction but disengaged when driving ring gear 312 rotates in a counterclockwise direction.

Thus, rotation is transferred throughout 2-to-1 rotation converter 300 as follows: rotation is input from rotation shaft 500 coupled to driving ring gear 312. Driving ring gear 312 rotates pinion gears 306. Pinion gears 306 rotate following ring gear 304. When rotation shaft 500 rotates in clockwise direction 334, hex mover 310 disengages with following ring gear 304 and engages with driving ring gear 312, and hex mover 310 rotates with driving ring gear 312 together in clockwise direction 334. When rotation shaft 500 switches from the clockwise rotation direction to the counterclockwise rotation direction, hex mover 310 is pushed away from driving ring gear 312 to following ring gear 304 via the driving gear inner teeth 324 and hex mover driving teeth 322. Thus, hex mover 310 disengages with driving ring gear 312 and engages with following ring gear 304 via following gear inner teeth 316 and hex mover following teeth 320. Subsequently, hex mover 310 and following ring gear 304 rotate together. Since rotate shaft 500 rotates in the counterclockwise direction, driving ring gear 312 rotates in the counterclockwise direction, following ring gear 304 rotates in clockwise direction 334, and hex mover 310 also rotates in clockwise direction 334. Hex mover 310 rotates hex shaft 302. Hex mover 310 and hex shaft 302 are configured to always rotate in the same direction of rotation.

Figure 4A:
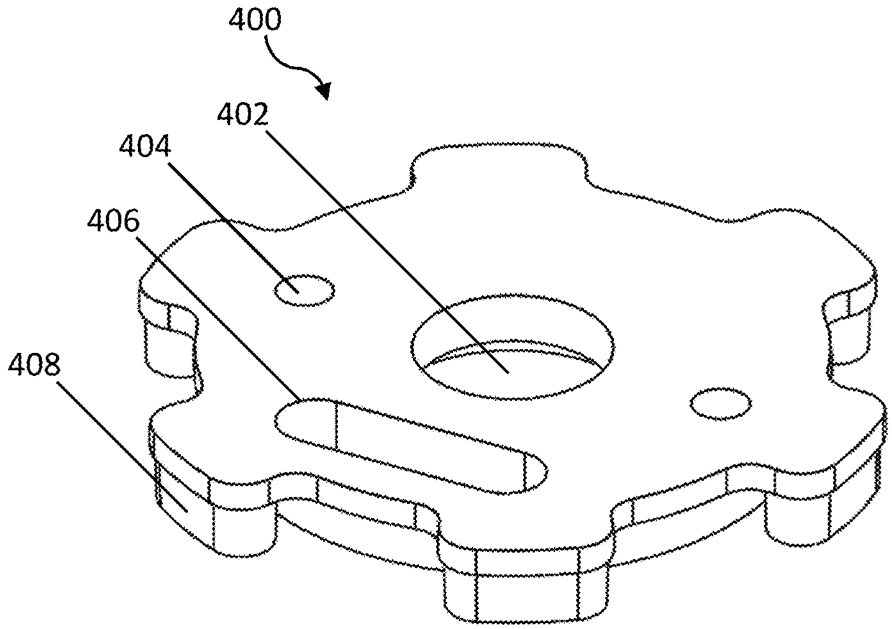
Figure 4B:
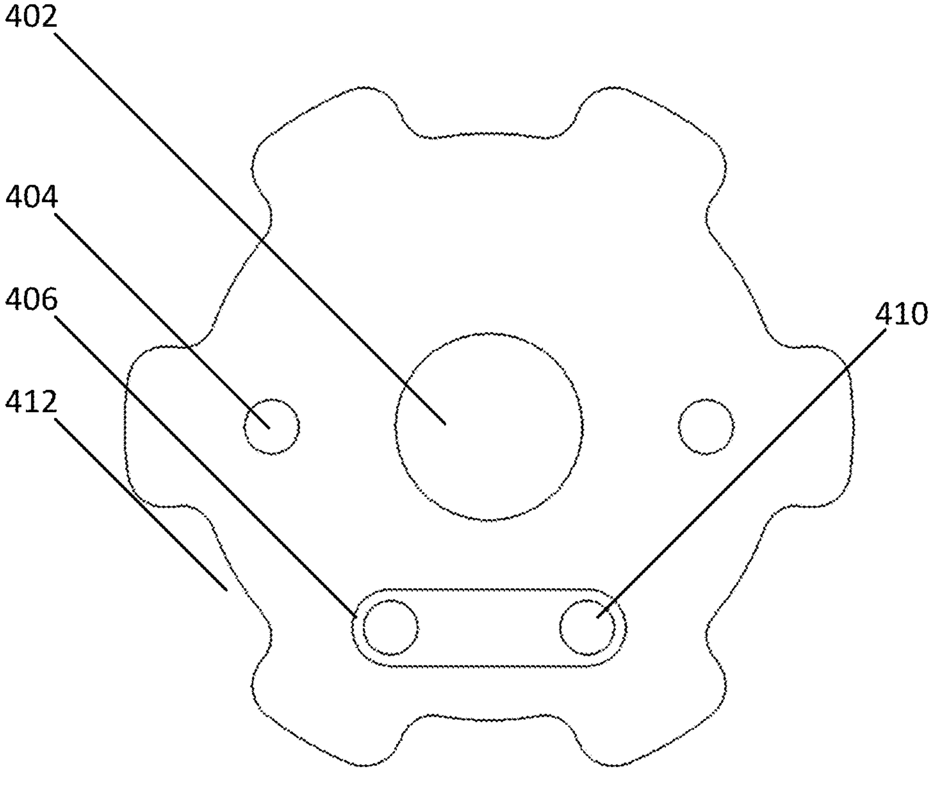

FIGS. 4A-4B illustrate an exemplary output cap, wherein FIG. 4A shows a perspective view of an exemplary output cap and FIG. 4B shows a top view of an exemplary output cap, in accordance with an embodiment of the present disclosure. Output cap 400 includes shaft opening 402, support rod openings 404, valve channel 406, pipe caps 408, and valve openings 410.

Output cap 400 is configured to control fluid flow within single shaft piston motor 1400, specifically within the pipes of cylindrical body 700 at an output end. Fluid flow within cylindrical body 700 will be described in greater detail below with reference to FIG. 7. To control fluid flow, output cap 400 includes pipe caps 408 evenly distributed in 6 directions. Pipe caps 408 may be coupled to several inner pipes of cylindrical body 700 such that fluid from the inner flows to the second chamber of cylindrical body 700. Pipe caps 408 may include means for sealing the inner pipes (e.g., transfer pipes 116 described in FIG. 1) of cylindrical body 700, such as, without limitation, rubber seals, gaskets, etc. In contrast, outlet gaps 412, evenly distributed between pipe caps 408, are configured to allow fluid from inner pipes (e.g., transfer pipes 116 described in FIG. 1) of cylindrical body 700 to flow to the outlet of single shaft rotation motor 1400.

Support rod openings 404 are configured to accept support rods 506, and shaft opening 402 is configured to accept rotation shaft 500, to be described with reference to FIG. 5 below. Similar to pipe caps 408, means for sealing may be used for support rod openings 404 and shaft opening 402 to prevent fluid from flowing out of support rod openings 404 and shaft opening 402. Valve channel 406 and valve openings 410 are configured to provide a mounting means for first forward valve 1202 and second forward valve 1220, to be described with reference to FIG. 12A below.

Figure 5:
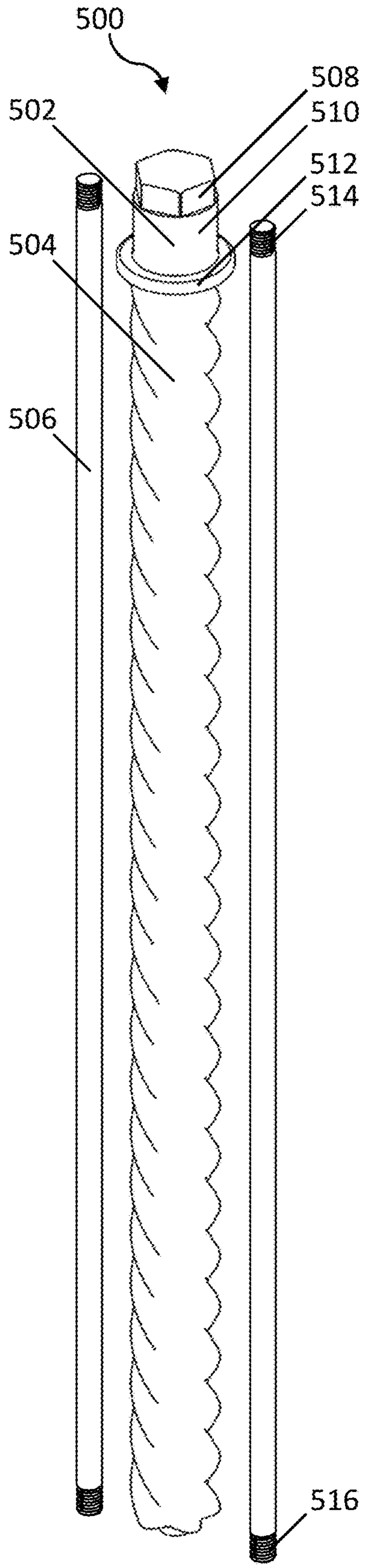
FIG. 5 illustrates an exemplary rotation shaft and support rods, in accordance with an embodiment of the present disclosure.

FIG. 5 illustrates an exemplary rotation shaft and support rods, in accordance with an embodiment of the present disclosure. Support rods 506 are configured to fasten output cap 400 to shaft connector 900, and thus to input cap 1000, where output cap 400 and input cap 1000 are each coupled to cylindrical body 700, and additionally prevent torsion of driving piston 600 (to be described with reference to FIG. 6). Two support rods 506 are shown in the present embodiment. However, as will be appreciated by one skilled in the art, a greater or lesser number of support rods may be used in the present embodiment depending on the specific application of single shaft piston motor 1400. Support rods 506 may pass through output cap 400 such that output cap threading 514 is exposed above support rod openings 604. A nut (not shown) may be threaded onto output cap threading 514 such that a portion of support rods 506 may be secured in place. Similarly, shaft connector threading 516 may be used to secure a portion of support rods 506 into support rod openings 902 of shaft connector 900 (to be described with reference to FIG. 9).

Rotation shaft 500 is configured to rotate in response to driving piston 600 (to be described with reference to FIG. 6) and provides a rotation input to 2-to-1 rotation converter 300 via shaft head 502. Shaft head 502 includes head hex 508, head body 510, and head lip 512. Head hex 508 is configured to be coupled to driving ring gear 312 of 2-to-1 rotation converter 300. Head body 510 is a smooth, intermediate portion of shaft head 502 between head hex 508 and head lip 512 configured to pass through shaft opening 402 of output cap 400. Head lip 512 is a portion of shaft head 502 and may secure rotation shaft 500 in place against a surface of output cap 400. A sealing means, such as, without limitation, a gasket, rubber seal, etc., with a means of reducing friction may be used on one or more of head body and head lip to prevent or minimize fluid from leaking through shaft opening 402 of output cap 400 while allowing for free rotation of rotation shaft 500 with low friction. Shaft body 504 is an elongated shaft configured to rotate as driving piston 600 slides along the length of rotation shaft 500. Thus, shaft body 504 may be matched with shaft opening 602 of driving piston and, in the present embodiment, is a 5 spiral shaft with a star-shaped cross section. However, different configurations of rotation shaft 500 may be used in the present embodiment. For example, without limitation, shaft body 504 may include a greater or lesser number of spirals and thus have a different shaped cross section than shown in FIGS. 5 and 6, and accordingly a differently shaped shaft opening 602 of driving piston 600 may be used according to the shape of shaft body 504.

Figure 6:
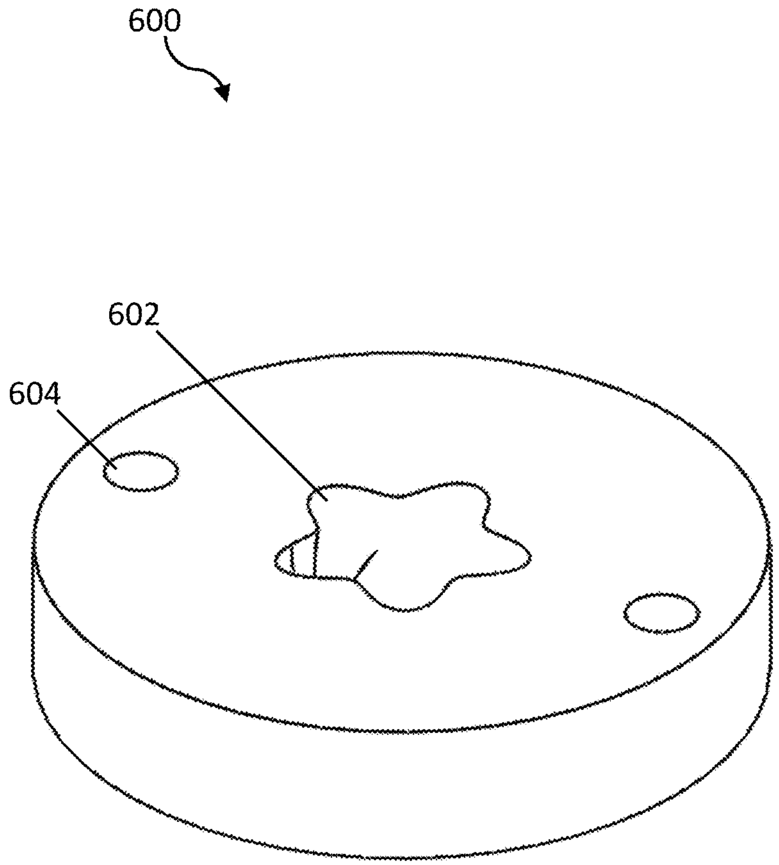
FIG. 6 illustrates an exemplary driving piston, in accordance with an embodiment of the present disclosure.

FIG. 6 illustrates an exemplary driving piston, in accordance with an embodiment of the present disclosure. Driving piston 600 is configured to slide along rotation shaft 500 within cylindrical body 700 according to fluid pressure at either side of driving piston 600. Thus, driving piston 600 may rotate rotation shaft 500 and generate a rotation output for single shaft piston motor 1400. For example, without limitation, with driving piston 600 moving in a forward direction, rotation shaft 500 may rotate in a clockwise direction. In contrast, with driving piston 600 moving in a reverse direction, rotation shaft 500 may rotate in a counterclockwise direction. Driving piston 600 may include a sealing means at shaft opening 602 and support rod openings 604 such as, without limitation, gaskets, rubber seals, etc. Additionally, driving piston 600 may be of various widths and is not limited to the width shown in FIG. 6.

Figure 7A:
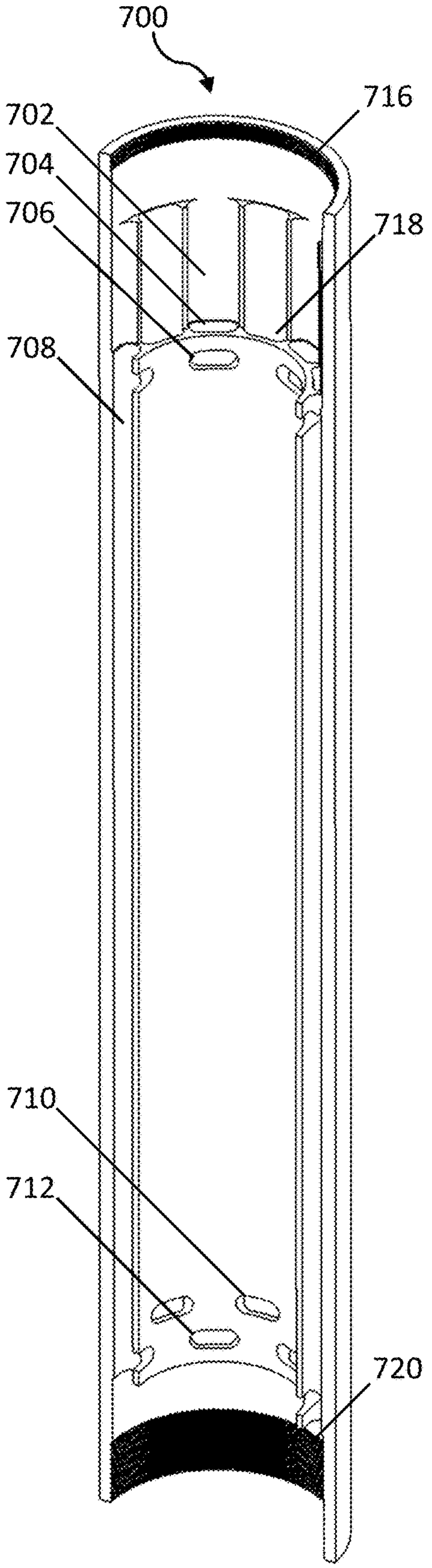
Figure 7B:
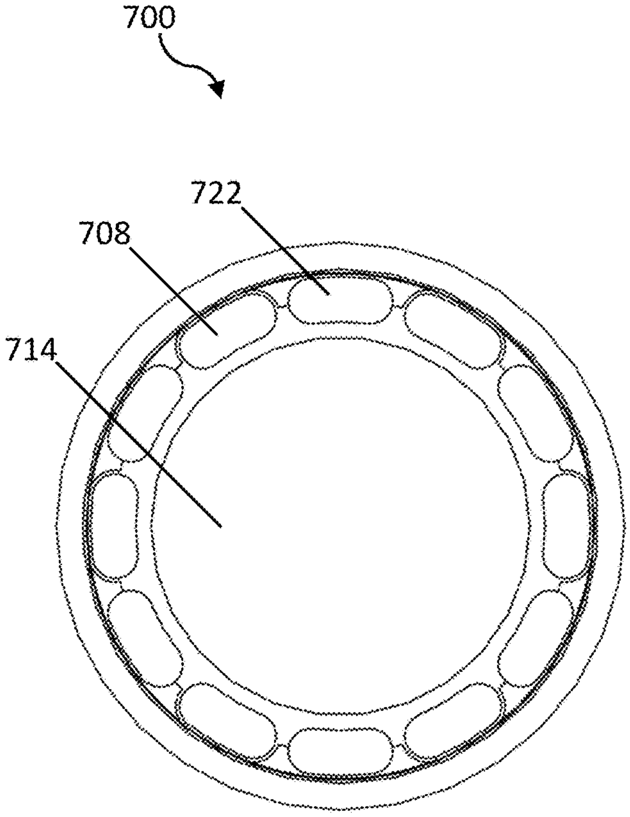

FIGS. 7A-7B illustrate an exemplary cylindrical body, wherein FIG. 7A shows a perspective cross-sectional view of an exemplary cylindrical body and FIG. 7B shows a top view of an exemplary cylindrical body, in accordance with an embodiment of the present disclosure. Cylindrical body 700 includes rotation converter channels 702, pipe cap openings 704, second transfer openings 706, transfer pipes 708, first outlet openings 710, first transfer openings 712, inner cavity 714, rotation output threading 716, second outlet openings 718, input threading 720, and outlet pipes 722. In the present embodiment, the cylindrical body may be, for example, without limitation, of a pipe shape, with a circular-outer cross-section, and a large ratio of length to diameter (or size). However, as will be appreciated by one skilled in the art, the outer cross-section of the cylindrical body may be other shapes, such as hexagonal, rectangular with rounded corners, slot-shaped, irregularly-shaped, etc.

Cylindrical body 700 is configured to house the remaining components of single shaft piston motor 1400 and is adapted for optimal fluid flow within inner cavity 714 and through transfer pipes 708 and outlet pipes 722. Inner cavity 714 is an inner portion of cylindrical body 700 and is surrounded by evenly distributed transfer pipes 708 and outlet pipes 722 (as shown in FIG. 7B). Inner cavity 714 is separated into a first chamber and a second chamber by flow piston 600, where fluid is moved into and out of the first chamber and the second chamber via transfer pipes 708 and outlet pipes 722. It should be noted that as driving piston 600 slides along rotation shaft 500 within inner cavity 714 of cylindrical body 700, the sizes of the first chamber and the second chamber are variable relative to each other. For example, without limitation, when driving piston 600 moves in a forward direction, the second chamber decreases in volume while the first chamber increases in volume, and when driving piston 600 moves in a reverse direction, the second chamber increases in volume while the first chamber decreases in volume. Additionally, while transfer pipes 708 and outlet pipes 722 are integrated into cylindrical body 700 in the present embodiment, as will be appreciated by one skilled in the art, external pipes may be used instead of or in combination with transfer pipes 708 and outlet pipes 722 to transfer fluid within cylindrical body 700. For example, without limitation, an embodiment of the present invention utilizing external piping is shown with reference to FIGS. 1A-1H.

Cylindrical body 700 may be threaded onto a fluid input (e.g., regular drilling pipe) via input threading 720. The input may provide pressurized fluid to cylindrical body 700, thus enabling single shaft piston motor 1400 to convert energy from the pressurized fluid to rotation output via driving piston 600 and rotation shaft 500. Depending on the mode of single shaft piston motor 1400, the pressurized fluid may be input to either the first chamber or the second chamber. When input in the first chamber, the pressurized fluid causes driving piston 600 to move in the forward direction towards the rotation output. When input in the second chamber, the pressurized fluid causes driving piston 600 to move in the reverse direction towards the fluid input. The inner pipes of cylindrical body 700 enable fluid to be transferred between the first chamber and the second chamber, and similarly from each of the chambers to the output end of cylindrical body 700 opposite the fluid input.

When single shaft piston motor is in the first mode, fluid from the input flows directly into the first chamber, moving driving piston 600 in the forward direction and causing fluid in the second chamber to flow through second transfer openings 706 into transfer pipes 708, out of first transfer openings 712, through first outlet openings 710, through outlet pipes 722, through second outlet openings 718, and out the outlet side of cylindrical body 700. Thus, fluid is input to the first chamber, driving piston moves in the forward direction, and fluid flow out from the second chamber.

When single shaft piston motor is in the second mode, fluid from the input flows through first transfer openings 712, through transfer pipes 708, and out of second transfer openings 706 into the second chamber. Thus, driving piston moves in the reverse direction, fluid from first chamber flows through first outlet openings 710, through outlet pipes 722, and out second outlet openings 718 to the output end of cylindrical body 700.

Fluid is controlled within cylindrical body 700 via flow piston 800 (to be described with reference to FIGS. 8A-8B), control cylinder 1100 (to be described with reference to FIGS. 11A-11B), and a cylinder switch system (to be described with reference to FIGS. 12A-12B). An overview of the flow sequence within single shaft piston motor 1400 was described above with reference to FIGS. 1A-1H.

In the present embodiment, cylindrical body 700 includes six transfer pipes 708 and six outlet pipes 722, where transfer pipes 708 and outlet pipes 722 are alternately distributed within cylindrical body 700. Namely, outlet pipes 722 are configured to transfer fluid from the first chamber and the second chamber to the output via first outlet openings 710 and second outlet openings 718, and transfer pipes 708 are configured to transfer fluid between the first chamber and the second chamber via second transfer openings 706 and first transfer opening 712. The flow mechanisms of outlet pipes 722 and the transfer pipes 708 are shown with reference to FIGS. 1A-1H. It should be noted that the position of flow piston 800 (to be described with reference to FIGS. 8A-8B) determines how fluid flows within cylindrical body 700.

At the output end of cylindrical body 700, rotation converter channels 702 are configured to mount 2-to-1 rotation converter 300, and rotation output threading 716 is configured to be threaded with cylindrical body threading 212 of drill bit connector 200. Thus, 2-to-1 rotation converter 300 and drill bit connector 200 are mountable to cylindrical body 700.

Figure 8A:
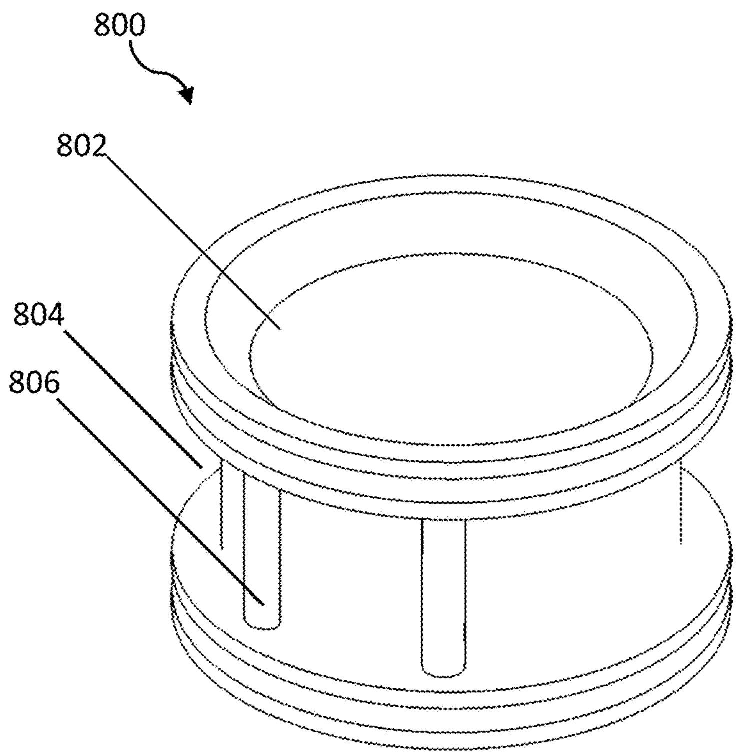
Figure 8B:
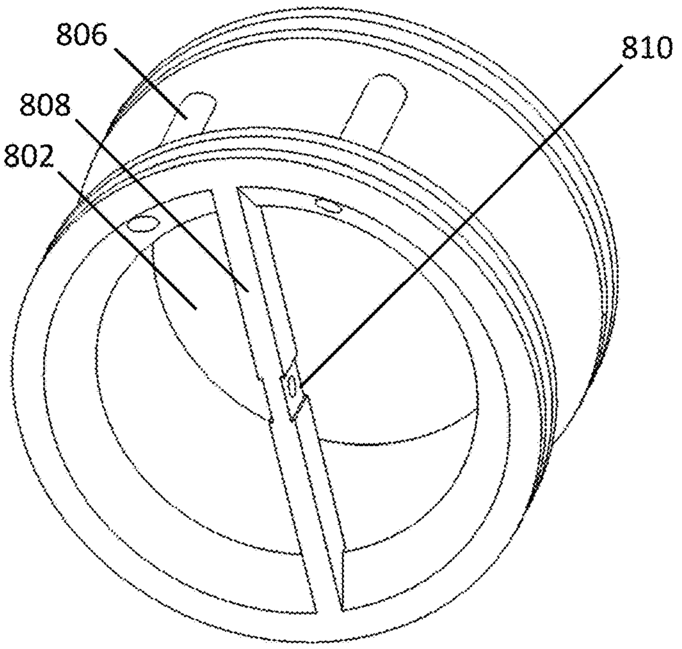

FIGS. 8A-8B illustrate an exemplary flow piston, wherein FIG. 8A shows a top perspective view of an exemplary flow piston and FIG. 8B shows a bottom perspective view of an exemplary flow piston, in accordance with an embodiment of the present disclosure. Flow piston 800 includes inner passage 802, annular transfer chamber 804, trigger passage 806, flow piston support 808, and shaft connector 810.

Flow piston 800 is configured to be in a first position and a second position within cylindrical body 700. For example, without limitation, when flow piston 800 is in the first position, driving piston 600 moves in the forward direction as fluid pressure in the first chamber of cylindrical body 700 is greater than fluid pressure in the second chamber. When flow piston 800 is in the second position, driving piston 600 moves in the reverse direction as fluid pressure in the second chamber of cylindrical body 700 is greater than fluid pressure in the first chamber.

Inner passage 802 is an inner cavity of flow piston 800, and is configured to allow for fluid to flow from the input to the first chamber when driving piston 800 is in the first position.

Annular transfer chamber 804 is an intermediate chamber along a periphery of flow piston 800, and is formed with cylindrical body 700. Annular transfer chamber 804 is configured to allow for transfer of fluid from the second chamber to the output when flow piston 800 is in the first position, and configured to allow for transfer of fluid from the input to the second chamber when flow piston 800 is in the second position.

Trigger passage 806 are pass-through channels for rear triggers 1210 (to be described with reference to FIGS. 12A-12B).

Flow piston support 808 is a supporting beam perpendicular to an opening of inner passage 802 and includes shaft connector 810 as a mounting location for flow piston connector 1102 of control cylinder 1100 (to be described with reference to FIG. 11). In combination with control cylinder 1100, forward triggers 1208, and rear triggers 1210, flow piston is configured to move between the first position and the second position.

Figure 9:
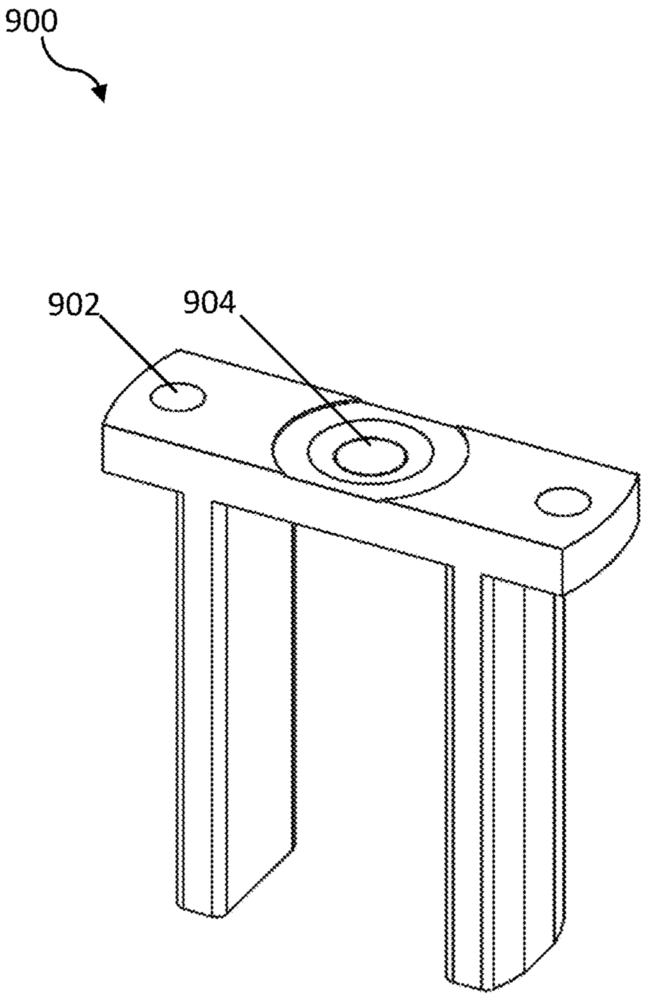
FIG. 9 illustrates an exemplary shaft connector, in accordance with an embodiment of the present disclosure.

FIG. 9 illustrates an exemplary shaft connector, in accordance with an embodiment of the present disclosure. Shaft connector 900 includes support rod openings 902 and rotation shaft opening 904.

Shaft connector 900 is configured to support support rods 506 via support rod openings 902 and rotation shaft 500 via rotation shaft opening 904. Shaft connector 900 is configured to be mounted within inner passage 802 of flow piston 800 and on input cap 1000 via shaft connector recess 1012 (to be described with reference to FIGS. 10A-10B).

Figure 10A:
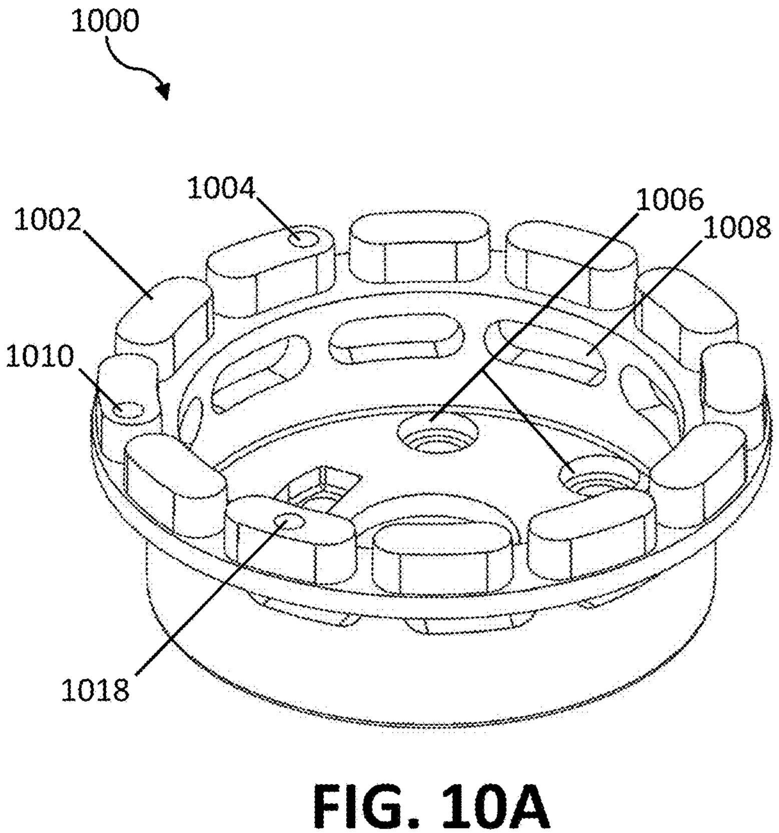
Figure 10B:
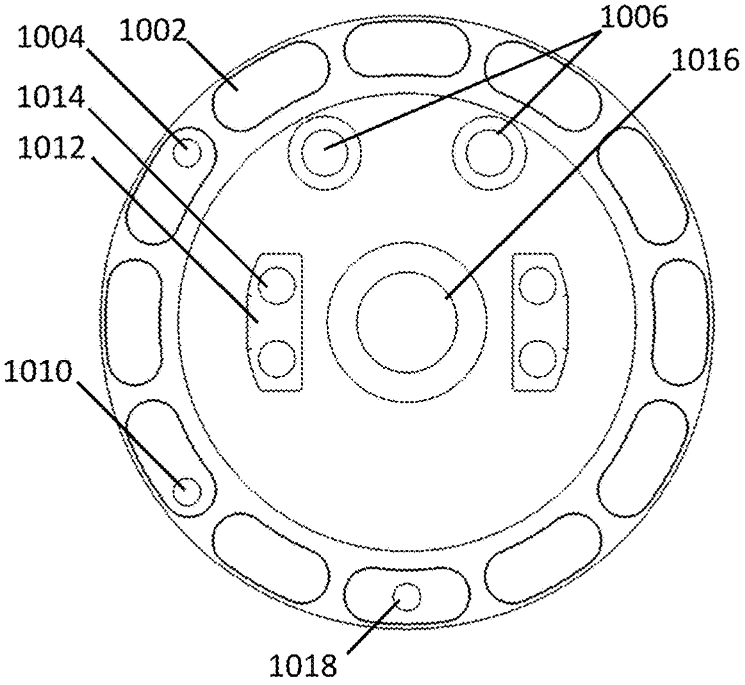

FIGS. 10A-10B illustrate an exemplary input cap, wherein FIG. 10A shows a perspective view of an exemplary input cap and FIG. 10B shows a top view of an exemplary input cap, in accordance with an embodiment of the present disclosure. Input cap 1000 includes inner pipe caps 1002, cylinder pipe openings 1004, 1010, and 1018, valve openings 1006, inlet openings 1008, shaft connector recesses 1012, shaft connector bolt openings 1014, and cylinder opening 1016.

Input cap 1000, in combination with flow piston 800, is configured to control fluid input of single shaft piston motor 1400. Fluid from the input of single shaft piston motor 1400 flows into inlet openings 1008 and, depending on the position of flow piston 800, flows into either first chamber or second chamber of cylindrical body 700. When flow piston 800 is in the second position, inlet openings 1008 of input cap 1000 and first transfer openings 712 of cylindrical body 700 are sealed within annular transfer chamber 804 of flow piston 800; thus, inlet openings 1008 are connected to first transfer openings 712 and fluid from the input flows through inlet openings 1008, through first transfer openings 712, and into the second chamber of cylindrical body 700.

When flow piston 800 is in the first position, fluid from the input flows through inlet openings 1008, through inner passage 802 of flow piston 800, and into the first chamber of cylindrical body 700.

Input cap 1000 further includes mounting means for the cylinder switch system (to be further described with reference to FIGS. 12A-12B and FIGS. 13A-13B). The mounting means includes, for example, without limitation, cylinder pipe openings 1004, 1010, and 1018, valve openings 1006, inlet openings 1008, and cylinder openings 1016. The mounting means are generally openings in input cap 1000 configured to support the cylinder switch system.

Figure 11A:
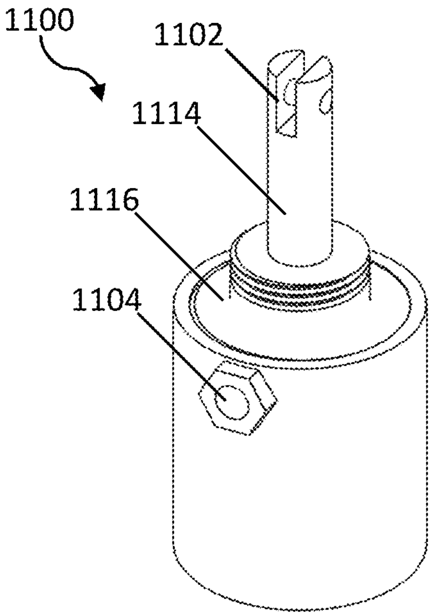
Figure 11B:
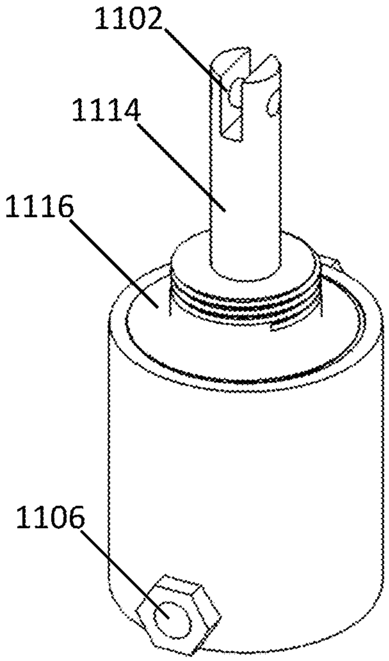
Figure 11C:
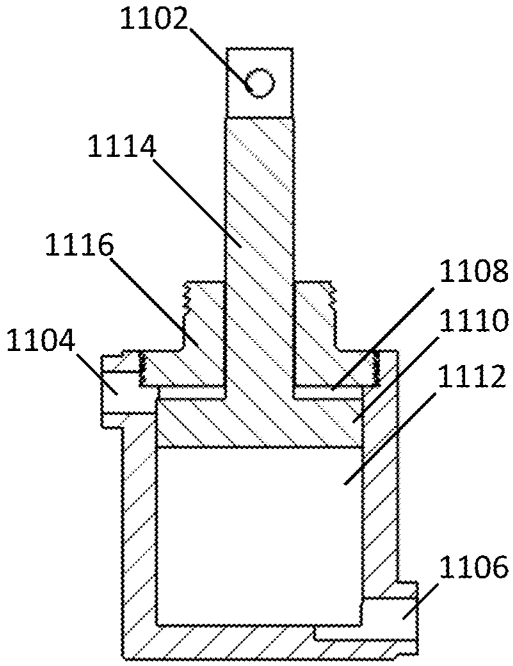

FIGS. 11A-11C illustrate an exemplary control cylinder, wherein FIG. 11A shows a front perspective view of an exemplary control cylinder, FIG. 11B shows a rear perspective view of an exemplary control cylinder, and FIG. 11C shows a right cross-sectional view of an exemplary control cylinder in accordance with an embodiment of the present disclosure. Control cylinder 1100 includes flow piston connector 1102, first control cylinder opening 1104, second control cylinder opening 1106, first cylinder chamber 1108, control cylinder piston 1110, second cylinder chamber 1112, control cylinder shaft 1114, and control cylinder cap 1116.

Control cylinder 1100 is configured to move flow piston 800 between the first position and the second position via control cylinder shaft 1114 and flow piston connector 1102. Flow piston connector 1102 may be coupled to flow piston support 808 via a coupling means, such as, without limitation, a screw, fastener, adhesive, bracket, etc. As shown in FIG. 11C, flow piston 800 is in a first position and corresponds to the first position of flow piston 800. In the first position, first cylinder chamber 1108 is of a smaller volume when compared to second cylinder chamber 1112. In contrast, when in the second position, control cylinder piston 1110 may be adjacent to second control cylinder opening 1106 such that flow piston 800 is in the second position. In the present embodiment, movement of control cylinder piston 1110 is powered by fluid pressure. Namely, when control cylinder piston 1110 is to move from the first position to the second position, pressurized fluid may enter control cylinder 1100 via first control cylinder opening 1104. Thus, first cylinder chamber 1108 has a higher pressure than second cylinder chamber 1112 and control cylinder piston 1110 moves toward second control cylinder opening 1106 such that control cylinder piston 1110 is in the second position.

Conversely, when control cylinder piston 1110 is in the second position and is to move into the first position, pressurized fluid enters control cylinder 1100 via second control cylinder opening 1106; causing second cylinder chamber 1112 to be of a higher pressure than first cylinder chamber 1108. Thus, control cylinder piston 1110 moves towards first control cylinder opening 1104 such that control cylinder piston 1110 is in the first position.

Control cylinder cap 1116 may seal an end of control cylinder 1100, and is configured to be threaded onto both the end of control cylinder 1100 and into control cylinder opening 1016 of input cap 1000.

Figure 12A:
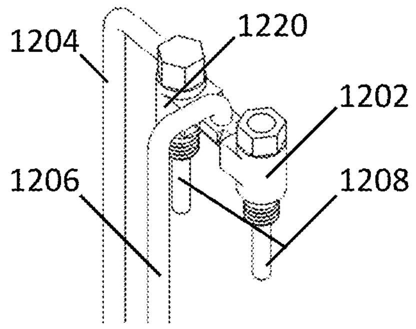
Figure 12B:
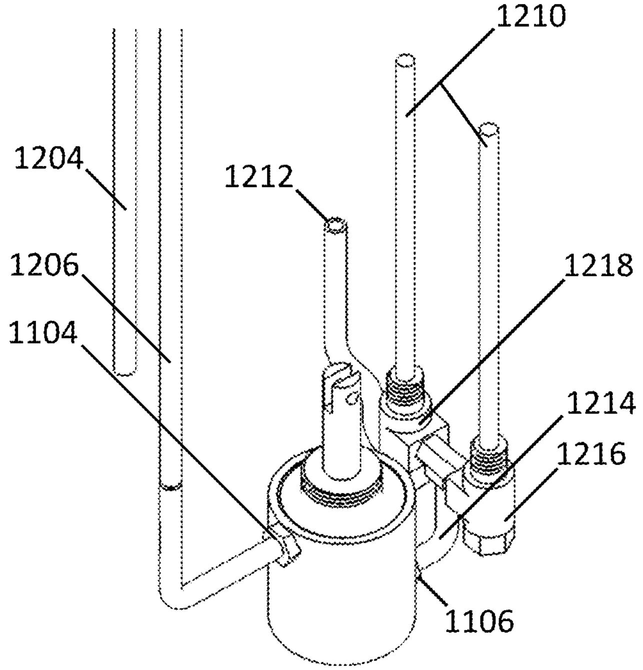

FIGS. 12A-12B illustrate an exemplary cylinder switch system, wherein FIG. 12A shows a section of an exemplary cylinder switch system integrated with an output cap and FIG. 12B shows a section of an exemplary cylinder switch system integrated with an input cap, in accordance with an embodiment of the present disclosure The cylinder switch system includes first forward valve 1202, first cylinder pipe 1204, second cylinder pipe 1206, forward triggers 1208, rear triggers 1210, third cylinder pipe 1212, fourth cylinder pipe 1214, first rear valve 1216, second rear valve 1218, and second forward valve 1220. The first forward valve 1202, second forward valve 1220, first rear valve 1216, and second rear valve 1218 are normally-closed valves. In the present disclosure, normally-closed valves may be valves that are only open during triggering, and remain closed prior to and after being triggered to open.

The combination of the triggers (including forward triggers 1208 and rear triggers 1210), control cylinder pipes (including first cylinder pipe 1204, second cylinder pipe 12016, third cylinder pipe 1212, and fourth cylinder pipe 1214), and valves (including first forward valve 1202, first rear valve 1216, second rear valve 1218, and second forward valve 1220) of the cylinder switch system are configured to control the position of control cylinder 1100.

Forward triggers 1208 and rear triggers 1210 are configured to be pressed by driving piston 600. When control cylinder 1100 is in the first position, driving piston 600 moves in the forward direction and activates forward triggers 1208. When forward triggers 1208 are activated, the valves of the control switch system are configured to move control cylinder 1100 from the first position to the second position such that driving piston 600 moves in the reverse direction. Specifically, when forward triggers 1208 are activated, first forward valve 1202 is closed while second forward valve 1220 is opened. Thus, fluid flows through first cylinder pipe 1204, through second forward valve 1220, through second cylinder pipe 1206, and into first control cylinder opening 1104 of control cylinder 1100. Simultaneously, in response to activation of forward triggers 1208, first rear valve 1216 is closed while second rear valve 1218 is opened. Thus, fluid is output from control cylinder 1100 via second control cylinder opening 1106, flows through fourth cylinder pipe 1214, through second rear valve 1218, and through third cylinder pipe 1212.

It should be noted that control cylinder pipes 1204, 1206, and 1212 pass through outlet pipes 722 of cylindrical body 700. For example, without limitation, third cylinder pipe 1212 may output fluid into an outlet pipes of cylindrical body 700.

When control cylinder 1100 is in the second position, driving piston 600 moves in the reverse direction and activates rear triggers 1210. When rear triggers 1210 are activated, the valves of the control switch system are configured to move control cylinder 1100 from the second position to the first position such that driving piston 600 moves in the forward direction. Specifically, when rear triggers 1210 are activated, first rear valve 1216 is opened while second rear valve 1218 is closed. Thus, fluid flows into first rear valve 1216, through fourth cylinder pipe 1214, and into second control cylinder opening 1106 of control cylinder 1100. Simultaneously, in response to activation of rear triggers 1210, first forward valve 1202 is opened and second forward valve 1220 is closed. Thus, fluid flows out of first control cylinder opening 1104 of control cylinder 1100, through second cylinder pipe 1206, and out of first forward valve 1202 to the output of single shaft piston motor 1400. As such, control cylinder 1100 is successfully transitioned from the second position to the first position, causing driving piston 600 to move in the forward direction.

Figure 13A:
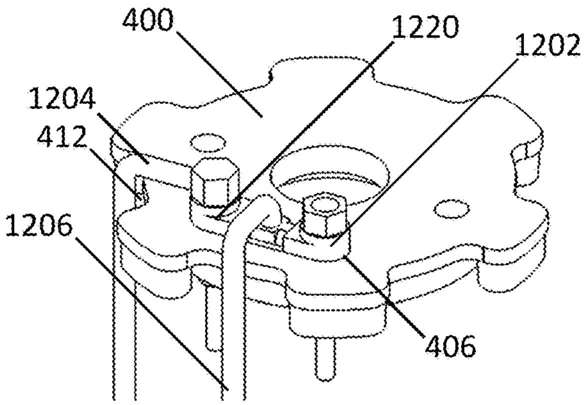
Figure 13B:
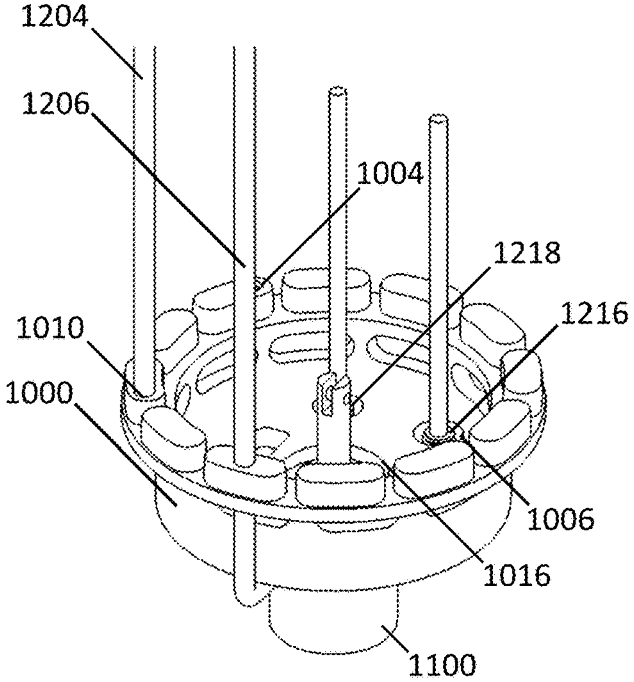

FIGS. 13A-13B illustrate an incorporated exemplary cylinder switch system, wherein FIG. 13A shows a section integrated with an output cap and FIG. 13B shows a section integrated with an input cap, in accordance with an embodiment of the present disclosure. As shown, the cylinder switch system (described with reference to FIGS. 12A-12B) is integrated with output cap 400 of FIGS. 4A-4B and input cap 1000 of FIGS. 10A-10B.

With reference to FIG. 13A, first forward valve 1202 and second forward valve 1220 are securely seated into valve channel 406, while first cylinder pipe 1204 and second cylinder pipe 1206 are configured to pass through outlet gaps 412 of output cap 400. Thus, the portion of the cylinder switch system as shown in FIG. 13A is incorporated into an output cap for single shaft piston motor 1400.

With reference to FIG. 13B, first rear valve 1216 and second rear valve 1218 are configured to pass through valve openings 1006 of input cap 1000, while cylinder 1100 is configured to pass through cylinder opening 1016. Additionally, first cylinder pipe 1204 and second cylinder pipe 1206 are configured to pass through cylinder pipe opening 1010 and cylinder pipe opening 1018, respectively. Third cylinder pipe 1212 is similarly configured to pass through cylinder pipe opening 1004. Thus, the portion of the cylinder switch system as shown in FIG. 13A is incorporated into an input cap for single shaft piston motor 1400.

Figure 14:
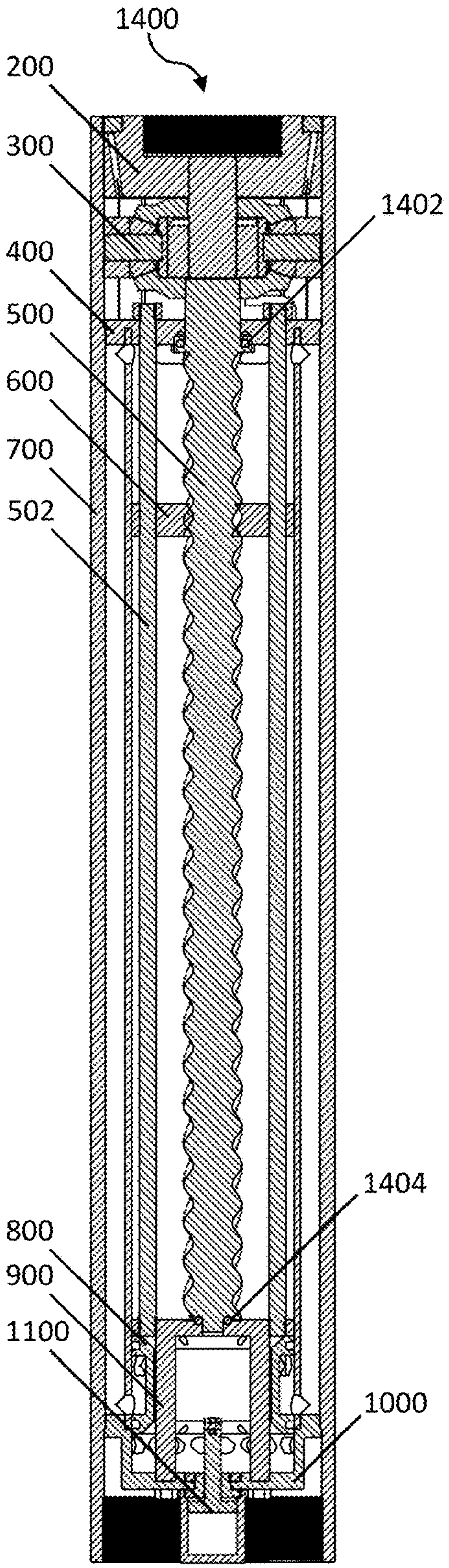
FIG. 14 illustrates a cross-sectional view of a single-shaft piston motor system, in accordance with an embodiment of the present disclosure.

FIG. 14 illustrates a cross-sectional view of a single-shaft piston motor, in accordance with an embodiment of the present disclosure. Single shaft piston motor 1400 encompasses a combination of one or more components described with reference to FIGS. 2A-13B above. In particular, the one or more components of FIGS. 2A-13B may be coupled together to form single shaft piston motor 1400. It should be appreciated that single shaft piston motor 1400 is not limited to including the one or more components of FIGS. 2A-13B, and may include additional or fewer components than those listed above.

Single shaft piston motor 1400 may include cylindrical body 700 to house the remaining components of single shaft piston motor 1400, where cylindrical body 700 may be secured to drill bit connector 200 through rotation output threading 716, and to a fluid input of single shaft piston motor 1400 through input threading 720.

Drill bit connector 200 may be coupled to an output of 2-to-1 rotation converter 300. 2-to-1 rotation converter 300 may be coupled, at its input, to rotation shaft 500. Rotation shaft 500 may pass through output cap 400, while output cap 400 is secured to support rods 506. Driving piston 600 may be slidably connected to rotation shaft 500. Rotation shaft 500 may be coupled at its rear end to shaft connector 900. At an input portion of cylindrical body 700, the control means, including but not limited to flow piston 800, input cap 1000, and control piston 1100 may be mounted to cylindrical body 700. Specifically, control cylinder may pass through input cap 1000 and may be coupled to flow piston 800.

Single shaft piston motor 1400 may include various elements not mentioned in FIGS. 2A-13B but are nonetheless incorporated into the present invention. For example, without limitation, output cap bearings 1402 and shaft connector bearings 1404 may be used between rotation shaft 500 and output cap 400, and between rotation shaft 500 and shaft connector 900, respectively, to facilitate the rotation of rotation shaft 500. In another example, various screws, nuts, bolts, and other such fastening means may be used within single shaft piston motor 1400 to enable the coupling of the one or more components to each other.

Figure 15:
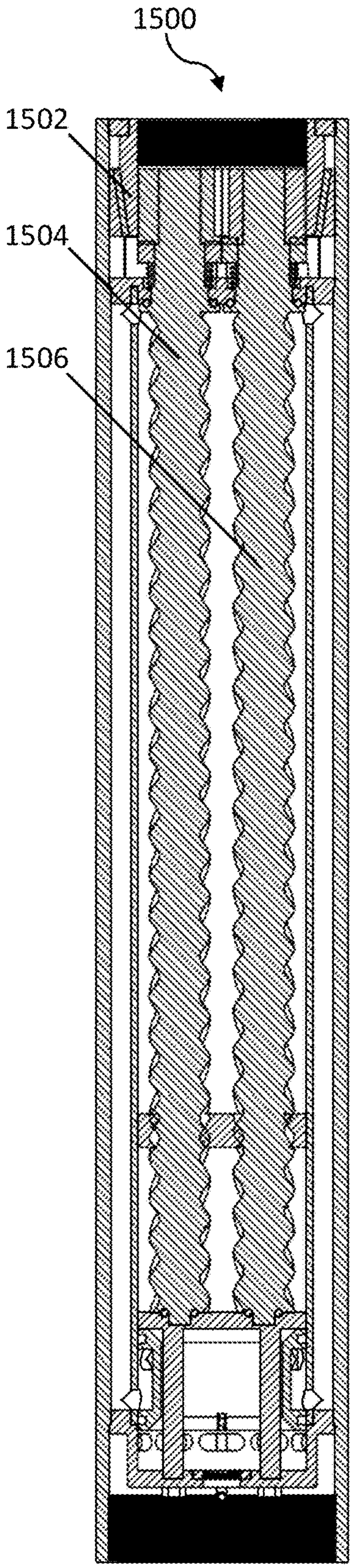
FIG. 15 illustrates a cross-sectional view of a double-shaft piston motor, in accordance with an embodiment of the present disclosure.

FIG. 15 illustrates a cross-sectional view of a double-shaft piston motor, in accordance with an embodiment of the present disclosure. The present invention is not limited to single shaft piston motor 1400, and may include, for example, without limitation, double shaft piston motor 1500. Double shaft piston motor 1500 may be of a similar structure to single shaft piston motor 1400, except adapted to include first rotation shaft 1504 and second rotation shaft 1506. Additionally, double shaft piston motor 1500 may include a different means for converting rotation from first rotation shaft 1504 and second rotation shaft 1506 to rotation output 1502. The specific structure of rotation output 1502 is described below, with reference to FIGS. 16A-16B.

Figure 16A:
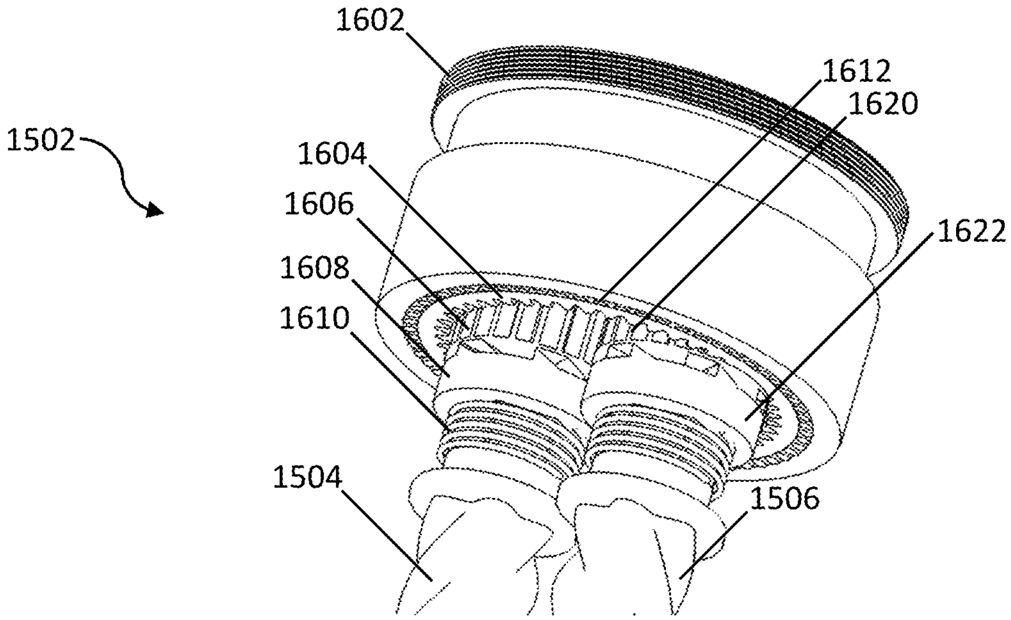
Figure 16B:
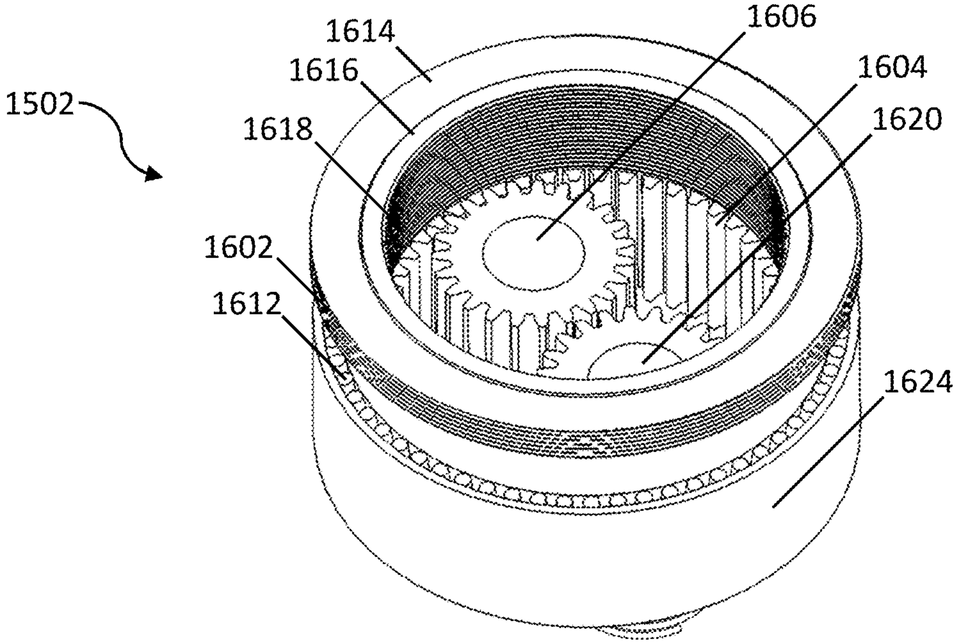

FIGS. 16A-16B illustrate an exemplary rotation output for a double-shaft piston motor, wherein FIG. 16A shows a first view of a rotation output for a double-shaft piston motor, and FIG. 16B shows a second view of a rotation output for a double-shaft piston motor, in accordance with an embodiment of the present disclosure. Rotation output 1502 includes, for example, without limitation, outer thread 1602, outer gear 1604, first inner gear 1606, first hex mover 1608, springs 1610, bearing needles 1612, outer cylinder 1614, inner cylinder 1616, inner threading 1618, second inner gear 1620, second hex mover 1622, and bearing outer body 1624.

Figure 17:
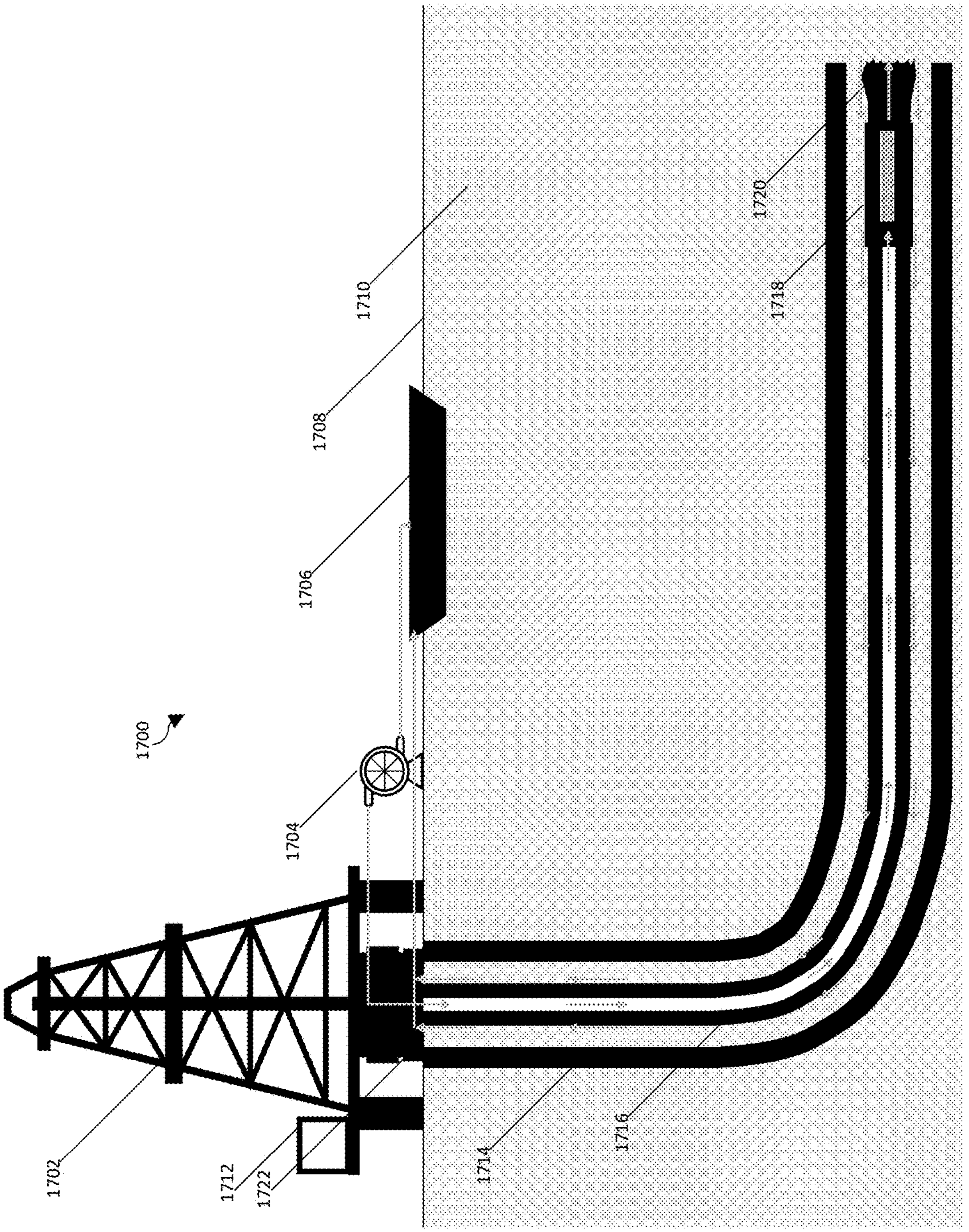
FIG. 17 illustrates an operating environment of a piston motor system, in accordance with an embodiment of the present disclosure.

Rotation output 1502 is configured to convert the rotation of first rotation shaft 1504 and second rotation shaft 1506 into a single output rotation direction to power, for example, an oil and gas well drill bit (e.g., drill bit 1720 in FIG. 17). The spiral configuration of first rotation shaft 1504 and second rotation shaft 1506 are in opposite directions such that, as the driving piston moves forward and backward along the lengths of first rotation shaft 1504 and second rotation shaft 1506, first rotation shaft 1504 and second rotation shaft 1506 rotate in opposite directions. Output ends of first rotation shaft 1504 and second rotation shaft 1506 include first hex mover 1608 and second hex mover 1622, respectively, where first hex mover 1608 is matched with first inner gear 1606 and second hex mover 1622 is matched with second inner gear 1620. The rotation direction of the respective rotation shaft determines an engaged state or a disengaged state of the hex movers in relation to the inner gears. In the present embodiment, the hex movers are in an engaged state when the attached rotation shaft rotates in a clockwise direction.

For example, without limitation, the movement of the driving piston in the forward direction causes first rotation shaft 1504 to rotate in a clockwise direction and second rotation shaft 1506 to rotate in a counterclockwise direction. Thus, first hex mover 1608 and first inner gear 1606 are in an engaged state, while second hex mover 1622 and second inner gear 1620 are in a disengaged state. While in the engaged state, first hex mover 1608 is configured to rotate first inner gear 1606. In contrast while in the disengaged state, the rotation of second hex mover 1622 is not transferred to second inner gear 1620, and second inner gear 1620 rotates independently from rotation shaft 1506. Thus, rotation from first rotation shaft 1504 is transferred to outer gear 1604 via first inner gear 1606. In the present configuration, second inner gear 1620 freely rotates with outer gear 1604, and rotation is not transferred from second rotation shaft 1506 to rotation output 1502. It should be noted that the teeth of first inner gear 1606 and second inner gear 1620 are engaged with the teeth of outer gear 1604, but are not engaged with each other.

When the driving piston moves in the reverse direction, first rotation shaft 1504 rotates in a counterclockwise direction and second rotation shaft 1506 rotates in a clockwise direction. Thus, second hex mover 1622 and second inner gear 1620 are in an engaged state, and rotation is transferred from second rotation shaft 1506 to rotation output 1502, while rotation is not transferred from first rotation shaft 1504 to rotation output 1502.

Each of rotation shafts 1504 and 1506 may include springs 1610 configured to apply compression to first hex mover 1608 and second hex mover 1622, to help engagement of hex movers and inner gears but still allow disengagement. When drilling piston is switching from forward movement to reverse movement, the structure of first hex mover 1608 and first inner gear 1606 forces first hex mover 1608 to move away from first inner gear 1606, while spring 1610 pushes second hex mover 1622 to engage with second inner gear 1620. In contrast when drilling piston is switching from reverse movement to forward movement, the structure of second hex mover 1622 and second inner gear 1620 forces second hex mover 1622 to move away from second inner gear 1620, while spring 1610 pushes first hex mover 1608 to engage with first inner gear 1606. Thus, only when rotation shaft rotates clockwise, its hex mover and inner gear engages with each other and inner gear rotates clockwise, to rotate outer gear 1604 clockwise.

Outer gear 1604 is coupled to outer cylinder 1614, and outer cylinder 1614 is coupled to inner cylinder 1616 such that the rotation from the rotation shafts is transferred to outer gear 1604, and rotation from outer gear 1604 is transferred from outer cylinder 1614 to inner cylinder 1616. Rotation output 1502 may also include bearings 1612 between outer gear 1604 and outer casing 1628 to facilitate the rotation of outer gear 1604. Inner cylinder 1616 may include inner threading 1618, where an output attachment may be threaded. In the present embodiment, the output attachment may be, for example, without limitation, a drill bit. However, as will be appreciated by one skilled in the art, other output attachments may also be used.

While the present invention may include embodiments such as single shaft piston motor 1400 and double shaft piston motor 1500, alternative embodiments are also within the scope of the present invention, and embodiments with a greater number of rotation shafts may be used. With an even number of rotation shafts (e.g., 4, 6, 8, etc.), functionality may be similar to that of double shaft piston motor 1500, wherein half of the rotation shafts may be in an engaged state while the other half of the rotation shafts may be in the disengaged state.

FIG. 17 illustrates an operating environment of a piston motor system, in accordance with an embodiment of the present disclosure.

Well drilling system 1700 includes, for example, without limitation, drilling derrick 1702, drilling mud pump 1704, drilling mud container 1706, control system 1712, wellbore walls 1714, drilling pipe 1716, piston motor 1718, drill bit 1720, and blowout preventer 1722.

Well drilling system 1700 may be used to efficiently drill beneath ground surface 1708 and through subsurface rocks 1710. Drilling derrick 1702 may be used as a support structure for system 1700, and allows for new sections of drill pipe 1716 to be added to system 1700 as drilling progresses. Different types of drilling derricks may be used depending on the specific application, such as single, double, triple, quadric, conventional, slant, etc. Further, drill piston motor 1718 may be coupled to any suitable drill bit known in the art, such as, without limitation, roller cone bits, mill tooth bits, insert drilling bits, diamond drilling bits, Polycrystalline Diamond Compact bits, thermally stable polycrystalline bits, etc. Sections of wellbore walls 1714 and drill pipe 1716 may be added to system 1700 during drilling operation. Drilling pipe 1716 may provide fluid to piston motor 1718 via drilling mud pump 1704, where fluid may pass through piston motor 1718 and drill bit 1720 and be discarded to the surface via a space between drilling pipe 1716 and wellbore walls 1714. The fluid may be recycled to drilling mud container 1706 as an input to drilling mud pump 1704.

Control system 1712 may be any type of drilling control system known in the art, and may communicate with drilling mud pump 1704, drilling derrick 1702, and blowout preventer 1722 via wired or wireless connection. In one embodiment, control system 1712 may be integrated with drilling mud pump 1704 as a single entity. Control system 1712 may also communicate with piston motor 1718 to determine a status of the drilling operation and provide for failure detection of well drilling system 1700. For example, without limitation, a decrease in torque or rate of penetration (ROP) of the drilling system may be indicative of an error within the system, and control system 1712 may be used to automatically or manually pause the drilling operation such that diagnostic procedures may be completed.

Figure 18A:
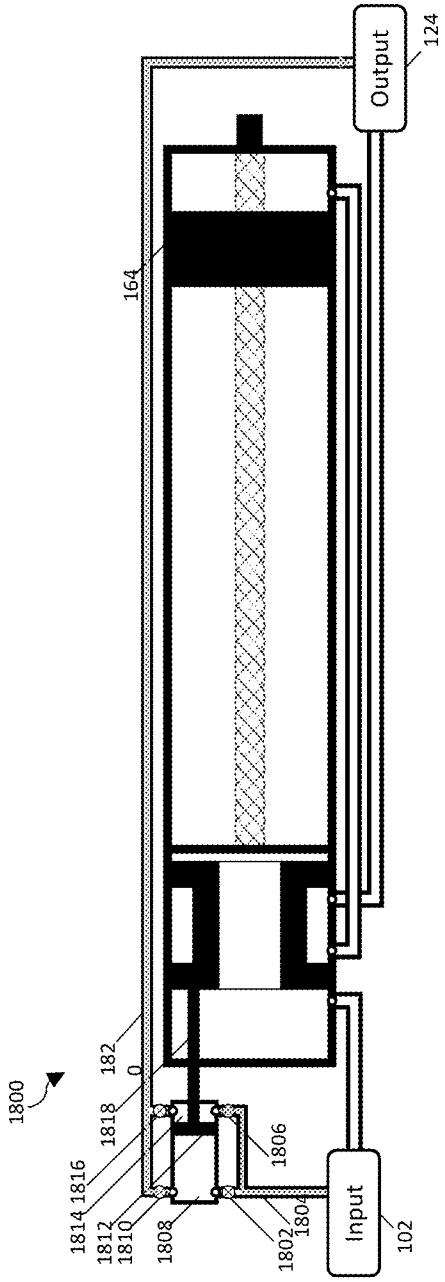
Figure 18B:
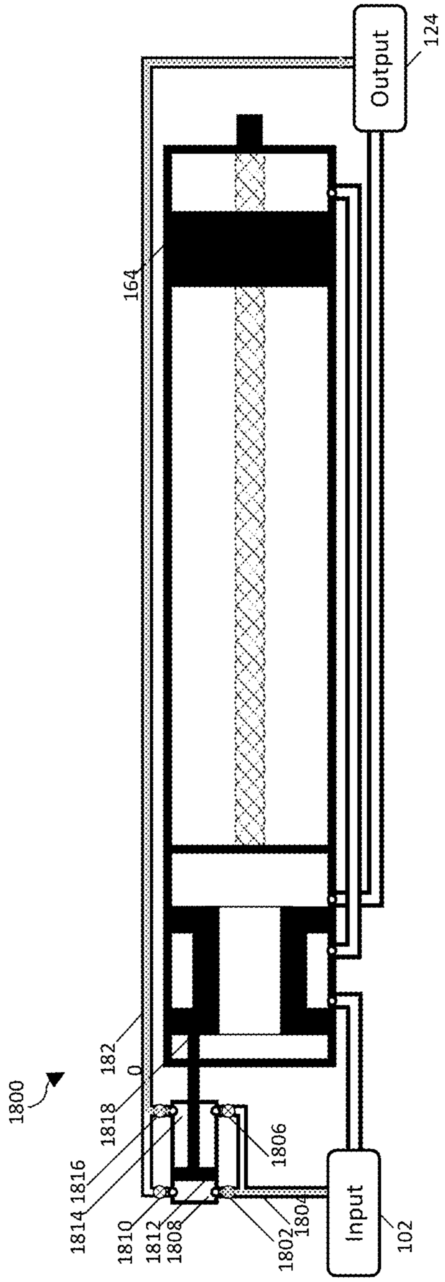

FIGS. 18A-18B illustrate a fluid flow sequence of a second embodiment of an exemplary piston motor system, wherein FIG. 18A shows an exemplary flow piston moving from a first position to a second position and FIG. 18B shows an exemplary flow piston moving from a second position to a first position, in accordance with an embodiment of the present disclosure. Secondary piston motor 1800 is substantially similar to piston motor 100, albeit a change in the control system for flow piston 112. In the present embodiment, secondary piston motor 1800 includes first input valve 1802, cylinder inlet pipe 1804, second input valve 1806, first cylinder chamber 1808, first output valve 1810, control cylinder piston 1812, second cylinder chamber 1814, second output valve 1816, control cylinder shaft 1818, and cylinder outlet pipe 1820. The first input valve 1802, second input valve 1806, first output valve 1810, and second output valve 1816 are normally-closed valves.

Control of flow piston 112 in the present invention may be achieved through various different means, and results in flow piston 112 moving between the first and second positions and thus control the direction of movement of driving piston 164. While the present embodiment illustrates a fluid-powered control system (as shown with reference to FIGS. 1A-1H and FIGS. 18A-18B), alternative control means may be used, such as, without limitation, mechanical motor control, control through the use of electrical signaling, pneumatic control, etc. FIGS. 18A-18B illustrate an exemplary alternative fluid control means for the present invention.

After driving piston 164 reaches a forward end of piston motor 1800 and activates forward triggers (not shown), flow piston 112 is configured to move from a first position to a second position via the control system. Activation of the forward triggers causes second input valve 1806 to open causing fluid to flow from input 102 into second cylinder chamber 1814 via cylinder inlet pipe 1804. Thus, pressure in second cylinder chamber 1814 is of a higher pressure than the pressure in first cylinder chamber 1808, causing control cylinder piston 1814 (and thus flow piston 112 via control cylinder shaft 1818) to move from the first position to the second position. Simultaneously, first output valve 1810 is opened in response to activation of the forward triggers, and fluid in first cylinder chamber 1808 is forced through cylinder outlet pipe 1820 to output 124.

As shown in FIG. 18B, after driving piston 164 reaches a rear end of piston motor 1800 and activates rear triggers (not shown), flow piston 112 is configured to move from a second position to a first position via the control system. Activation of the rear triggers causes first input valve 1802 to open, causing fluid to flow from input 102 into first cylinder chamber 1808 via cylinder inlet pipe 1804. Thus, pressure in first cylinder chamber 1808 is of a higher pressure than pressure in second cylinder chamber 1814, causing control cylinder piston 1812 (and thus flow piston 112 via control cylinder shaft 1818) to move from the second position to the first position. Simultaneously, second output valve 1816 is opened in response to activation of the rear triggers, and fluid in second cylinder chamber 1814 is forced through cylinder outlet pipe 1820 to output 124.

Figure 19:
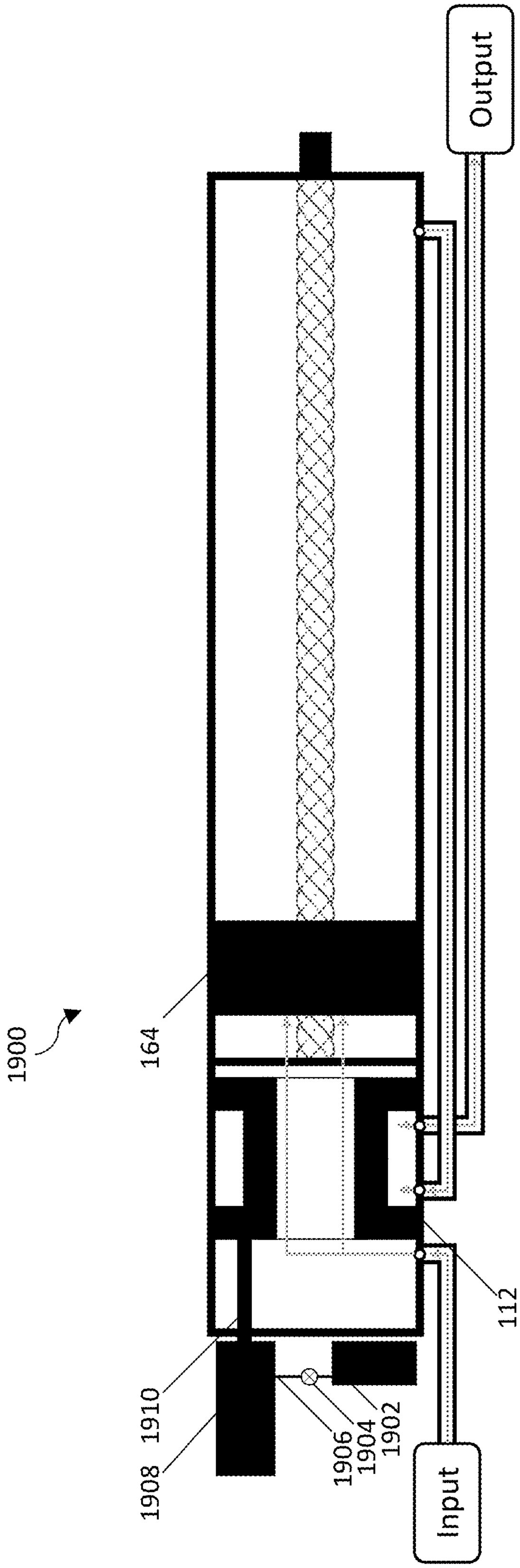
FIG. 19 illustrates a fluid flow sequence of a third embodiment of an exemplary piston motor system, in accordance with an embodiment of the present disclosure.

FIG. 19 illustrates a fluid flow sequence of a third embodiment of an exemplary piston motor system, in accordance with an embodiment of the present disclosure.

Piston motor system 1900 includes, for example, without limitation, battery 1902, switch 1904, wiring 1906, motor 1908, and motor shaft 1910.

In piston motor system 1900, flow piston 112 moves between the first position and the second position via motor 1908. Motor 1908 is preferably a direct current (DC) motor, but may be any suitable motor known in the art, such as, without limitation, an alternating current (AC) motor, direct drive, linear motor, etc. Motor 1908 may be coupled to battery 1902 via wiring 1906, where battery 1902 is configured to power motor 1908. In the present embodiment, switch 1904 may be used to control motor 1908, and cause motor shaft 1910 to move flow piston 112 between the first position and the second position. For example, without limitation, when driving piston reaches a forward end of piston motor 1900, forward triggers (not shown) are triggered and signal switch 1904 to activate, causing motor 1908 to move flow piston 112 from the first position to the second position via motor shaft 1910. Similarly, when driving piston reaches a rear end of piston motor 1900, rear triggers (not shown) are triggered and signal switch 1904 to activate, causing motor 1908 to move flow piston 112 from the second position to the first position via motor shaft 1910. Switch 1904 may communicate with forward triggers and rear triggers via wireless or wired connection.

Torque (τ) of the motor results from the pressure difference on the two sides of driving piston (ΔP), the piston diameter (D), the driving shaft stage length (length for 360° rotation; L), and the driving shaft diameter (d). With ignoring friction between driving piston and chamber wall and friction between driving piston and ration shaft, the torque of the piston motor of the present disclosure may be calculated according to:

$$\tau = \frac{(D^2 - d^2)L\Delta P}{8}. \tag{1}$$

For example, without limitation, pump pressure may be 8 MPa and generates a pressure difference on the two sides of the driving piston, the driving shaft stage length is 600 mm, driving piston diameter is 100 mm, and driving shaft diameter is 30 mm, the torque is about 3400 N m (~2500 ft-lb). The pressure difference is mainly controlled by pump pressure as well as friction between the fluid and the drilling pipe, friction between the driving piston and chamber wall, and hydrostatic pressure difference between the drilling pipe inside and the drilling pipe-wellbore annular space. In a preferred embodiment, the pump pressure may be 1 MPa-10 MPa, even higher.

The rotation rate (ROP) may depend on the flow rate (R), the piston diameter (D), the driving shaft stage length (L), and the driving shaft diameter (d). The rotation rate of the piston motor of the present disclosure may be calculated according to:

$$ROP = \frac{4 * R}{\pi(D^2 - d^2)L}. \tag{2}$$

For example, without limitation, flow rate may be 500 liter/minute (131 gallons per minute), the driving shaft stage length is 300 mm, driving piston diameter is 100 mm, and driving shaft diameter is 30 mm, resulting in a rotation rate of approximately 230 rpm. The flow rate may be mainly controlled by the pump rate, and in a preferred embodiment, may be up to 500 gpm (gallons per minute).

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible considering the said teachings or may be acquired from practicing the disclosed embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the said-described embodiments, but instead is defined by the appended claims considering their full scope of equivalents.

What is claimed is:

1. A rotation converter configured to convert an alternative clockwise-counterclockwise rotation to a single rotation direction, comprising:

a hex shaft comprising an input hex, an output hex, and a gear contact, wherein the input hex and output hex are separated by the gear contact;

a hex mover coupled to the input hex, wherein the hex mover comprises following teeth and driving teeth;

a following ring gear in contact with the following teeth;

a driving ring gear in contact with the driving teeth;

one or more gear pinions in contact with the following ring gear and the driving ring gear;

one or more gear rods configured to support the one or more gear pinions; and a gear holder coupled to the one or more gear rods.

2. The rotation converter of claim 1, wherein the driving ring gear is configured to be coupled to a rotation input;

the driving ring gear is configured to rotate in a clockwise direction in response to the rotation input rotating in the clockwise direction; and the driving ring gear is configured to rotate in a counter-clockwise direction in response to the rotation input rotating in the counterclockwise direction.

3. The rotation converter of claim 2, wherein the driving gear comprises driving gear inner teeth.

4. The rotation converter of claim 3, wherein the driving gear inner teeth are configured to engage with the driving teeth when the driving ring gear rotates in the clockwise direction, causing the hex mover to rotate in the clockwise direction; and the driving gear inner teeth are configured to disengage with the driving teeth when the driving ring gear rotates in the counterclockwise direction.

5. The rotation converter of claim 2, wherein the following ring gear comprises following gear inner teeth.

6. The rotation converter of claim 5, wherein the following gear inner teeth are configured to engage with the hex mover following teeth when the driving ring gear rotates in the counterclockwise direction, causing the hex mover to rotate in the clockwise direction; and the following gear inner teeth are configured to disengage with the hex mover following teeth when the driving ring gear rotates in the clockwise direction.

7. The rotation converter of claim 2, wherein the hex mover is pushed towards the driving ring gear when the driving ring gear rotates in the clockwise direction; and the hex mover is pushed towards the following ring gear when the driving ring gear rotates in the counterclockwise direction.

8. The rotation converter of claim 1, wherein gear teeth of the one or more gear pinions are in contact with driving gear outer teeth of the driving ring gear and following gear outer teeth of the following ring gear.

9. The rotation converter of claim 8, wherein the hex mover and the hex shaft are configured to rotate in a single rotation direction.

10. The rotation converter of claim 9, wherein a rotation direction of the following ring gear is opposite to a rotation direction of the driving ring gear.

11. The rotation converter of claim 1, wherein the driving ring gear is configured to rotate the one or more gear pinions, and the one or more gear pinions are configured to rotate the following ring gear.

12. The rotation converter of claim 1, wherein the output hex is configured to be coupled to a drill bit connector.

13. The rotation converter of claim 1, wherein the gear contact comprises a section of the hex shaft having a smooth outer surface such that the hex shaft is configured to rotate independently from the following ring gear.

14. The rotation converter of claim 1, wherein the hex shaft rotates in a same rotation direction as the hex mover.

15. The rotation converter of claim 1, wherein the one or more gear rods are separated from the hex mover such that a movement of the hex mover is independent from a movement of the one or more gear rods.

16. The rotation converter of claim 1, wherein the driving ring gear is parallel to the following ring gear.

* * * * *